US009843966B2

(12) United States Patent
Yasuda et al.

(10) Patent No.: US 9,843,966 B2
(45) Date of Patent: Dec. 12, 2017

(54) RADIO COMMUNICATION SYSTEM

(71) Applicant: NTT DOCOMO, INC., Tokyo (JP)

(72) Inventors: Hiroto Yasuda, Tokyo (JP); Yasufumi Morioka, Tokyo (JP); Jinho Kim, Tokyo (JP); Hideaki Takahashi, Tokyo (JP); Junichiro Hagiwara, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/400,765

(22) PCT Filed: Jun. 13, 2013

(86) PCT No.: PCT/JP2013/066302
§ 371 (c)(1),
(2) Date: Nov. 12, 2014

(87) PCT Pub. No.: WO2013/191074
PCT Pub. Date: Dec. 27, 2013

(65) Prior Publication Data
US 2015/0146688 A1    May 28, 2015

(30) Foreign Application Priority Data

Jun. 22, 2012  (JP) ................................ 2012-140899

(51) Int. Cl.
*H04W 36/00*  (2009.01)
*H04W 76/02*  (2009.01)

(52) U.S. Cl.
CPC ... *H04W 36/0005* (2013.01); *H04W 36/0055* (2013.01); *H04W 76/02* (2013.01)

(58) Field of Classification Search
CPC .................................................. H04W 76/046
See application file for complete search history.

(56) References Cited

U.S. PATENT DOCUMENTS

2008/0039096 A1* 2/2008 Forsberg ............... H04L 63/126
455/438
2015/0094073 A1* 4/2015 Peng ................... H04W 76/022
455/450

FOREIGN PATENT DOCUMENTS

CN        101674621 A    3/2010

OTHER PUBLICATIONS

International Search Report for corresponding International Application No. PCT/JP2013/066302, mailed Aug. 27, 2013 (2 pages).
(Continued)

*Primary Examiner* — Huy D Vu
*Assistant Examiner* — Teisha D Hall
(74) *Attorney, Agent, or Firm* — Osha Liang LLP

(57) ABSTRACT

A radio communication system includes a user device, a first base station, a second base station, a switching center, and a gateway device. In a handover operation performed in a situation in which a user-plane path has been established through the first base station, the first base station transmits, to the user device, a radio connection reconfiguration message commanding that a radio bearer be established between the second base station and the user device and receives a radio connection reconfiguration complete message transmitted from the user device. The first base station transmits, to the switching center, a path switching request message requesting that the established user-plane path be changed so as to pass through the second base station.

2 Claims, 18 Drawing Sheets

(56) References Cited

OTHER PUBLICATIONS

3GPP TS 23.401 V12.0.0; "3rd Generation Partnership Project; Technical Specification Group Services and System Aspects; General Packet Radio Service (GPRS) enhancements for Evolved Universal Terrestrial Radio Access Network (E-UTRAN) access (Release 12);" Mar. 2013 (290 pages).
3GPP TS 36.300 V10.6.0; "3rd Generation Partnership Project; Technical Specification Group Radio Access Network; Evolved Universal Terrestrial Radio Access Network (E-UTRAN); Overall description; Stage 2 (Release 10);" Dec. 2011 (194 pages).
Extended European Search Report in counterpart European Application No. 13 80 7644.3 issued Jan. 29, 2016 (8 pages).
3GPP TS 36.300 V11.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Mar. 2012 (194 pages).
Office Action issued in the counterpart Canadian Patent Application No. 2873687, mailed Mar. 17, 2017 (6 pages).
Office Action issued in corresponding Chinese Patent Application No. 201380039046.8, dated Aug. 9, 2017 (16 pages).
3GPP TS 36.300 v10.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Sep. 2010 (192 pages).

\* cited by examiner

RADIO COMMUNICATION SYSTEM

TECHNICAL FIELD

The present invention relates to radio communication systems.

BACKGROUND ART

Various radio communication systems that operate in accordance with 3GPP (Third Generation Partnership Project) protocols have been used. In radio communication systems that operate in accordance with LTE/SAE (Long Term Evolution/System Architecture Evolution) protocols specified by 3GPP, a logical communication path (a user-plane path) used for communicating user data is established in accordance with control by a switching center (Mobility Management Entity (MME)). The path of the established user-plane path can be switched in accordance with the control by the switching center. The control of the user-plane path described above is performed through a logical communication path (a control-plane path) used for communicating control data.

In the radio communication systems that operate in accordance with the conventional LTE protocols, an eNB (evolved Node B) is used as a radio base station that can communicate directly with a user device by radio. The eNB has a control-plane path to a switching center, to other eNB, and to a user device. When the user device newly starts communicating user data, the eNB, in accordance with a control message transmitted from the switching center through the control-plane path, operates so as to establish a user-plane path for the user device to use. The eNB to which the user device is currently connected exchanges, when the user device moves to a cell formed by another eNB, control messages with the user device and with the other eNB through control-plane paths so as to cause the user device to be handed over to the other eNB.

CITATION LIST

Non-Patent Document

Non-Patent Document 1: 3GPP TS 36.300 V10.6.0 (2011 December), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

SUMMARY OF INVENTION

Technical Problem

In addition to the eNB described above, a radio communication system is assumed to include a base station (a base station with limited control functions) that does not have a part of the control-plane paths (e.g., a control-plane path to the user device, a control-plane path to the switching center). A base station without a control-plane path to the user device cannot exchange control messages directly with the user device. A base station without a control-plane path to the switching center cannot exchange control messages directly with the switching center. Therefore, in the radio communication systems that operate in accordance with the conventional LTE protocols, it is difficult to establish a user-plane path through a base station with limited control functions or to change a node through which a user-plane path passes.

In light of the situation described above, an object of the present invention is to control a logical path that is established through a base station with limited control functions.

Solution to Problem

A radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is established between the user device and the gateway device through the first base station, the first base station determines, based on a measurement report message that is received from the user device and is related to radio waves that the second base station transmits, whether the first base station should cause the user device to be handed over to the second base station. When the first base station determines that the first base station should cause the user device to be handed over, the first base station transmits a handover request message to the second base station, the handover request message requesting that the user device be handed over to the second base station. The second base station, after receiving the handover request message, transmits a handover request acknowledgement message to the first base station. The first base station, after receiving the handover request acknowledgement message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station transmits a path switching request message to the switching center, the path switching request message including identification information of the second base station and requesting that the user-plane path, which is established between the user device and the gateway device and passes through the first base station, be changed so that the user-plane path passes through the second base station. The switching center transmits the path switching request message received from the first base station to the gateway device. The gateway device, after configuring the gateway device based on the path switching request message received from the switching center so that the user-plane path passes through the second base station, transmits a path switching request acknowledgement message to the switching center. The switching center transmits the path switching request acknowledgement message received from the gateway device to the first base station.

According to the above configuration, the first base station transmits a radio connection reconfiguration message to the user device and receives a radio connection reconfiguration complete message from the user device. Therefore, a user-plane path can be established through the second base station, which does not perform radio resource control of the user device (has limited control functions). Accordingly, it is made possible for the user device to be handed over to the second base station as a target base station. Moreover, since the first base station, which is a source base station, transmits a path switching request message to the switching center, even if the second base station and the switching center are not connected, the user device can be handed over to the second base station as the target base station.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is established between the user device and the gateway device through the first base station, the first base station determines, based on a measurement report message that is received from the user device and is related to radio waves that the second base station transmits, whether the first base station should cause the user device to be handed over to the second base station. When the first base station determines that the first base station should cause the user device to be handed over, the first base station transmits a handover request message to the second base station, the handover request message requesting that the user device be handed over to the second base station. The second base station, after receiving the handover request message, transmits a handover request acknowledgement message to the first base station. The first base station, after receiving the handover request acknowledgement message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station controls the second base station to cause the second base station to transmit a path switching request message to the switching center, the path switching request message requesting that the user-plane path, which is established between the user device and the gateway device and passes through the first base station, be changed so that the user-plane path passes through the second base station. The switching center transmits the path switching request message received from the second base station to the gateway device. The gateway device, after configuring the gateway device based on the path switching request message received from the switching center so that the user-plane path passes through the second base station, transmits a path switching request acknowledgement message to the switching center. The switching center transmits the path switching request acknowledgement message received from the gateway device to the second base station. The second base station, after receiving the path switching request acknowledgement message, transmits a message indicating that path switching has been completed to the first base station.

According to the above configuration, the first base station transmits a radio connection reconfiguration message to the user device and receives a radio connection reconfiguration complete message from the user device. Therefore, a user-plane path can be established through the second base station, which does not perform radio resource control of the user device (has limited control functions). Accordingly, the user device can be handed over to the second base station as a target base station.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is established between the user device and the gateway device through the second base station, the first base station determines, based on a measurement report message that is received from the user device and is related to radio waves that the first base station transmits, whether the first base station should cause the user device to be handed over to the first base station. When the first base station determines that the first base station should cause the user device to be handed over, the first base station transmits a handover request message to the second base station, the handover request message requesting that the user device be handed over to the first base station. The second base station, after receiving the handover request message, transmits a handover request acknowledgement message to the first base station. The first base station, after receiving the handover request acknowledgement message, transmits, to the user device, a radio connection reconfiguration message commanding that a radio bearer be established between the first base station and the user device. The user device, after configuring the user device so as to establish the radio bearer to the first base station in accordance with the radio connection reconfiguration message, transmits a radio connection reconfiguration complete message to the first base station. The first base station transmits a path switching request message to the switching center, the path switching request message including identification information of the first base station and requesting that the user-plane path, which is established between the user device and the gateway device and passes through the second base station, be changed so that the user-plane path passes through the first base station. The switching center transmits the path switching request message received from the first base station to the gateway device. The gateway device, after configuring the gateway device based on the path switching request message received from the switching center so that the user-plane path passes through the first base station, transmits a path switching request acknowledgement message to the switching center. The switching center transmits the path switching request acknowledgement message received from the gateway device to the first base station. The first base station transmits a context release message to the second base station, the context release message commanding that information related to the user-plane path that had been established through the second base station be deleted. The second base station deletes the information related to the user-plane path that had been established through the second base station.

According to the above configuration, the first base station transmits a radio connection reconfiguration message to the user device and receives a radio connection reconfiguration complete message from the user device. Therefore, even when a user-plane path is established through the second base station, which does not perform radio resource control of the user device (has limited control functions), i.e., even when the second base station is the source base station, the user device can be handed over to the first base station, which is the target base station.

Another radio communication system according to the present invention includes: a user device; base stations that include a first base station that performs radio resource control of the user device through a control-plane path, the control-plane path being a logical path established with the user device, and a second base station and a third base station that do not perform radio resource control of the user device; a gateway device; and a switching center that controls a user-plane path, the user-plane path being a logical path established between the user device and the gateway device. When the user-plane path is established between the user device and the gateway device through the second base station, the first base station determines, based on a measurement report message that is received from the user device and is related to radio waves that the third base station transmits, whether the first base station should cause the user device to be handed over to the third base station. When the first base station determines that the first base station should cause the user device to be handed over, the first base station transmits a handover request message directed at the third base station to the third base station, the handover request message including identification information of the second base station to which the user device is currently connected and requesting that the user device be handed over to the third base station. The third base station, after receiving the handover request message directed at the third base station, transmits a handover request message directed at the second base station to the second base station, the handover request message directed at the second base station requesting that the user device be handed over to the third base station. The second base station, after receiving the handover request message directed at the second base station, transmits a handover request acknowledgement message directed at the third base station to the third base station. The third base station, after receiving the handover request acknowledgement message directed at the third base station, transmits a handover request acknowledgement message directed at the first base station to the first base station. The first base station, after receiving the handover request acknowledgement message directed at the first base station, transmits, to the user device, a radio connection reconfiguration message commanding that a radio bearer be established between the third base station and the user device. The user device, after configuring the user device so as to establish the radio bearer to the third base station in accordance with the radio connection reconfiguration message, transmits a radio connection reconfiguration complete message to the first base station. The first base station transmits a path switching request message to the switching center, the path switching request message including identification information of the third base station and requesting that the user-plane path, which is established between the user device and the gateway device and passes through the second base station, be changed so that the user-plane path passes through the third base station. The switching center transmits the path switching request message received from the first base station to the gateway device. The gateway device, after configuring the gateway device based on the path switching request message received from the switching center so that the user-plane path passes through the third base station, transmits a path switching request acknowledgement message to the switching center. The switching center transmits the path switching request acknowledgement message received from the gateway device to the first base station. The first base station transmits the path switching request acknowledgement message received from the switching center to the second base station. The second base station deletes information related to the user-plane path that had been established through the second base station.

According to the above configuration, the first base station transmits a radio connection reconfiguration message to the user device and receives a radio connection reconfiguration complete message from the user device. Therefore, even though both a source base station and a target base station are base stations (the second base station, the third base station) that do not perform radio resource control of the user device (have limited control functions), the user device can be handed over. Moreover, after the first base station transmits a handover request message to the third base station, handover procedure is performed by the third base station and the second base station transmitting control messages. Therefore, compared with a configuration in which the first base station controls each base station individually, a control load on the first base station is reduced. Furthermore, since a handover request message is transmitted directly to the third base station, which is the target base station, compared with a configuration in which a handover request message is transmitted through another base station (the second base station, etc.), a control load on the first base station is suppressed even when the third base station cannot accommodate the user device.

Another radio communication system according to the present invention includes: a user device; base stations that include a first base station that performs radio resource control of the user device through a control-plane path, the control-plane path being a logical path established with the user device, and a second base station and a third base station that do not perform radio resource control of the user device; a gateway device; and a switching center that controls a user-plane path, the user-plane path being a logical path established between the user device and the gateway device. When the user-plane path is established between the user device and the gateway device through the second base station, the first base station determines, based on a measurement report message that is received from the user device and is related to radio waves that the third base station transmits, whether the first base station should cause the user device to be handed over to the third base station. When the first base station determines that the first base station should cause the user device to be handed over, the first base station transmits a handover request message directed at the third base station to the third base station, the handover request message including identification information of the second base station to which the user device is currently connected and identification information of the gateway device and requesting that the user device be handed over to the third base station. The third base station, after receiving the handover request message directed at the third base station, transmits a handover request acknowledgement message to the first base station. The first base station, after receiving the handover request acknowledgement message from the third base station, transmits a handover request message directed at the second base station to the second base station, the handover request message including identification information of the third base station and requesting that the user device be handed over to the third base station. The second base station, after receiving the handover request message directed at the second base station, transmits a handover request acknowledgement message to the first base station. The first base station, after receiving the handover request acknowledgement message from the second base station, transmits, to the user device, a radio connection reconfiguration message commanding that a radio bearer be established between the third base station and the user device. The user device, after configuring the user device so as to establish the radio bearer to the third base station in accordance with the radio connection reconfiguration message, transmits a radio connection reconfiguration complete message to the first base station. The first base station transmits a path switching request message to the switching center, the path switching request message including the identification information of the third base station and requesting that the user-plane path, which is established between the user device and the gateway device and passes through the second base station, be changed so that the user-plane path passes through the third base station. The switching center transmits the path switching request message received from the first base station to the gateway device. The gateway device, after configuring the gateway device based on the path switching request message received from the switching center so that the user-plane path passes through the third base station, transmits a path switching request acknowledgement message to the switching center. The switching center transmits the path switching request acknowledgement message received from the gateway device to the first base station, the first base station transmits the path switching request acknowledgement message received from the switching center to the second base station. The second base station deletes information related to the user-plane path that had been established through the second base station.

According to the above configuration, the first base station transmits a radio connection reconfiguration message to the user device and receives a radio connection reconfiguration complete message from the user device. Therefore, even though both a source base station and a target base station are base stations (the second base station, the third base station) that do not perform radio resource control of the user device (have limited control functions), the user device can be handed over. Moreover, the first base station transmits a handover request message to each of the second base station and the third base station. Therefore, compared with a configuration in which the first base station transmits a handover request message to any one of the base stations and the base stations other than the first base station (i.e., the second base station and the third base station) perform the handover procedure between them, overhead at the second base station and at the third base station is reduced.

Another radio communication system according to the present invention includes: a user device; base stations that include a first base station that performs radio resource control of the user device through a control-plane path, the control-plane path being a logical path established with the user device, and a second base station and a third base station that do not perform radio resource control of the user device; a gateway device; and a switching center that controls a user-plane path, the user-plane path being a logical path established between the user device and the gateway device. When the user-plane path is established between the user device and the gateway device through the second base station, the first base station determines, based on a measurement report message that is received from the user device and is related to radio waves that the third base station transmits, whether the first base station should cause the user device to be handed over to the third base station. When the first base station determines that the first base station should cause the user device to be handed over, the first base station transmits a handover request message directed at the second base station to the second base station, the handover request message including identification information of the third base station and requesting that the user device be handed over to the third base station The second base station, after receiving the handover request message directed at the second base station, transmits a handover request message directed at the third base station to the third base station, the handover request message including identification information of the gateway device and requesting that the user device be handed over to the third base station. The third base station, after receiving the handover request message directed at the third base station, transmits a handover request acknowledgement message directed at the second base station to the second base station. The second base station, after receiving the handover request acknowledgement message directed at the second base station, transmits a handover request acknowledgement message directed at the first base station to the first base station. The first base station, after receiving the handover request acknowledgement message directed at the first base station, transmits, to the user device, a radio connection reconfiguration message commanding that a radio bearer be established between the third base station and the user device. The user device, after configuring the user device so as to establish the radio bearer to the third base station in accordance with the radio connection reconfiguration message, transmits a radio connection reconfiguration complete message to the first base station. The first base station transmits a path switching request message to the switching center, the path switching request message including the identification information of the third base station and requesting that the user-plane path, which is established between the user device and the gateway device and passes through the second base station, be changed so that the user-plane path passes through the third base station. The switching center transmits the path switching request message received from the first base station to the gateway device. The gateway device, after configuring the gateway device based on the path switching request message received from the switching center so that the user-plane path passes through the third base station, transmits a path switching request acknowledgement message to the switching center. The switching center transmits the path switching request acknowledgement message received from the gateway device to the first base station. The first base station transmits the path switching request acknowledgement message received from the switching center to the second base station. The second base station deletes information related to the user-plane path that had been established through the second base station.

According to the above configuration, the first base station transmits a radio connection reconfiguration message to the user device and receives a radio connection reconfiguration complete message from the user device. Therefore, even though both a source base station and a target base station are base stations (the second base station, the third base station) that do not perform radio resource control of the user device (have limited control functions), the user device can be handed over. Moreover, after the first base station transmits a handover request message to the second base station, the handover procedure is performed by the second base station and the third base station transmitting control messages. Therefore, compared with a configuration in which the first base station controls each base station individually, a control load on the first base station is reduced.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is to be established between the user device and the gateway device through the second base station, the user device transmits, to the switching center, a message requesting establishment of the user-plane path. The switching center, in accordance with the message from the user device, transmits a session establishment request message to the gateway device, the session establishment request message requesting that the gateway device and the second base station be logically connected. The gateway device, after receiving the session establishment request message, transmits a session establishment response message that includes identification information of the gateway device to the switching center. The switching center, after receiving the session establishment response message, transmits a bearer establishment request message that includes the identification information of the gateway device to the first base station. The first base station, after receiving the bearer establishment request message, transmits an initial context setup request message that includes the identification information of the gateway device to the second base station. The second base station, after receiving the initial context setup request message, transmits an initial context setup response message that includes identification information of the second base station to the first base station. The first base station, after receiving the initial context setup response message, transmits a bearer establishment response message that includes the identification information of the second base station to the switching center. The switching center, after receiving the bearer establishment response message, transmits a context setup request message to the first base station. The first base station, after receiving the context setup request message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station, after receiving the radio connection reconfiguration complete message, transmits a context setup complete message to the switching center.

According to the above configuration, after receiving a bearer establishment request message from the switching center, the first base station controls the second base station and the user device so that a user-plane path is established through the second base station. Thus, a user-plane path can be established through the second base station, which does not perform radio resource control of the user device.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is to be established between the user device and the gateway device through the second base station, the user device transmits, to the switching center, a message requesting establishment of the user-plane path. The switching center, in accordance with the message from the user device, transmits a session establishment request message to the gateway device, the session establishment request message requesting that the gateway device and the second base station be logically connected. The gateway device, after receiving the session establishment request message, transmits a session establishment response message that includes identification information of the gateway device to the switching center. The switching center, after receiving the session establishment response message, transmits a bearer establishment request message that includes the identification information of the gateway device to the first base station. The first base station, after receiving the bearer establishment request message, transmits a handover request message that includes the identification information of the gateway device to the second base station. The second base station, after receiving the handover request message, transmits a handover request acknowledgement message to the first base station. The first base station, after receiving the handover request acknowledgement message, transmits a bearer establishment response message that includes identification information of the first base station to the switching center, and subsequently, transmits a path switching request message to the switching center, the path switching request message requesting that the user-plane path be established between the user device and the gateway device through the second base station. The switching center transmits the path switching request message received from the first base station to the gateway device. The gateway device, after configuring the gateway device based on the path switching request message received from the switching center so that the user-plane path passes through the second base station, transmits a path switching request acknowledgement message to the switching center. The switching center transmits the path switching request acknowledgement message received from the gateway device to the first base station and transmits a context setup request message to the first base station. The first base station, after receiving the context setup request message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station, after receiving the radio connection reconfiguration complete message, transmits a context setup complete message to the switching center.

According to the above configuration, after receiving a bearer establishment request message from the switching center, the first base station controls the second base station and the user device so that a user-plane path is established through the second base station. The first base station requests the gateway device to perform path switching. Thus, a user-plane path can be established through the second base station, which does not perform radio resource control of the user device.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is to be established between the user device and the gateway device through the second base station, the user device transmits, to the switching center, a message requesting establishment of the user-plane path. The switching center, in accordance with the message from the user device, transmits a session establishment request message to the gateway device, the session establishment request message requesting that the gateway device and the second base station be logically connected. The gateway device, after receiving the session establishment request message, transmits a session establishment response message that includes identification information of the gateway device to the switching center. The switching center, after receiving the session establishment response message, transmits a bearer establishment request message that includes the identification information of the gateway device to the first base station. The first base station, after receiving the bearer establishment request message, transmits a handover request message that includes the identification information of the gateway device to the second base station. The second base station, after receiving the handover request message, transmits a handover request acknowledgement message to the first base station, and subsequently, transmits a path switching request message to the switching center, the path switching request message requesting that the user-plane path be established between the user device and the gateway device through the second base station. The first base station, after receiving the handover request acknowledgement message, transmits a bearer establishment response message that includes identification information of the first base station to the switching center. The switching center transmits the path switching request message received from the second base station to the gateway device. The gateway device, after configuring the gateway device based on the path switching request message received from the switching center so that the user-plane path passes through the second base station, transmits a path switching request acknowledgement message to the switching center. The switching center transmits the path switching request acknowledgement message received from the gateway device to the second base station and transmits a context setup request message to the first base station. The first base station, after receiving the context setup request message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station, after receiving the radio connection reconfiguration complete message, transmits a context setup complete message to the switching center.

According to the above configuration, after receiving a bearer establishment request message from the switching center, the first base station controls the second base station and the user device so that a user-plane path is established through the second base station. The second base station requests the gateway device to perform path switching. Thus, a user-plane path can be established through the second base station, which does not perform radio resource control of the user device.

Another radio communication system according to the present invention includes: a user device; base stations that include a first base station that performs radio resource control of the user device through a control-plane path, the control-plane path being a logical path established with the user device, and a second base station that does not perform radio resource control of the user device; a gateway device; and a switching center that controls a user-plane path, the user-plane path being a logical path established between the user device and the gateway device. When the user-plane path is to be established between the user device and the gateway device through the second base station, the user device transmits, to the switching center, a message requesting establishment of the user-plane path. The switching center, in accordance with the message from the user device, transmits a session establishment request message to the gateway device, the session establishment request message requesting that the gateway device and the second base station be logically connected. The gateway device, after receiving the session establishment request message, transmits a session establishment response message that includes identification information of the gateway device to the switching center. The switching center, after receiving the session establishment response message, transmits a bearer establishment request message that includes the identification information of the gateway device to the first base station. The first base station, after receiving the bearer establishment request message, transmits a bearer redirect message to the switching center, the bearer redirect message including identification information of the second base station and commanding that the user-plane path be established between the user device and the gateway device through the second base station. The switching center, after receiving the bearer redirect message, transmits an initial context setup request message that includes the identification information of the gateway device to the second base station. The second base station, after receiving the initial context setup request message, transmits an initial context setup response message to the switching center. The switching center transmits a context setup request message to the first base station. The first base station, after receiving the context setup request message, transmits, to the user device, a radio connection reconfiguration message commanding that a radio bearer be established between the second base station and the user device. The user device, after configuring the user device so as to establish the radio bearer to the second base station in accordance with the radio connection reconfiguration message, transmits a radio connection reconfiguration complete message to the first base station. The first base station, after receiving the radio connection reconfiguration complete message, transmits a context setup complete message to the switching center.

According to the above configuration, after receiving a bearer establishment request message from the switching center, the first base station controls the switching center so that a user-plane path is established through the second base station, and the switching center controls the second base station and the user device so as to establish the user-plane path. Thus, a user-plane path can be established through the second base station, which does not perform radio resource control of the user device.

DESCRIPTION OF EMBODIMENTS

First Embodiment 1-1. Configuration of Radio Communication System

Figure 1:
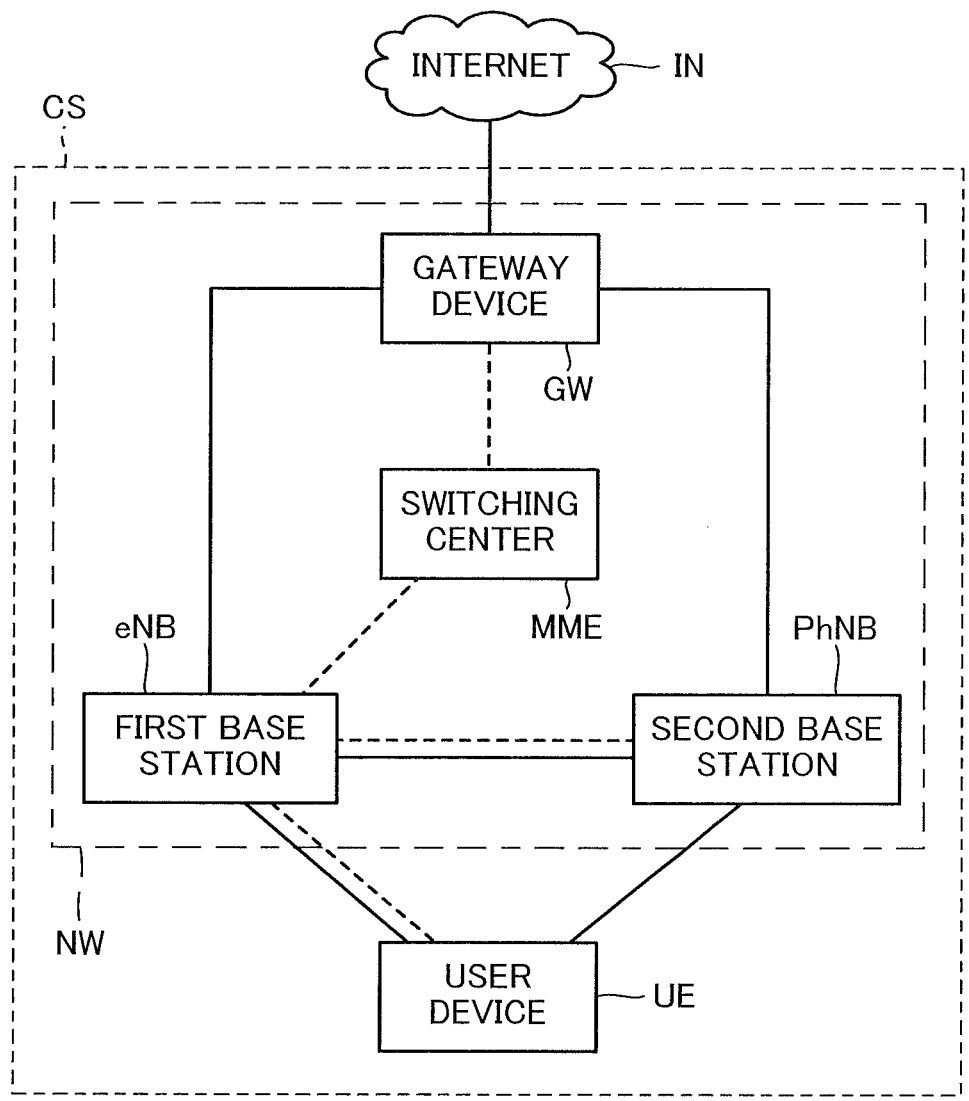
FIG. 1 is a block diagram illustrating a radio communication system according to a first embodiment of the present invention.

FIG. 1 is a block diagram of a radio communication system CS according to a first embodiment of the present invention. The radio communication system CS includes, as its elements, a user device UE, a first base station eNB, a second base station PhNB, a switching center MME, and a gateway device GW. A network NW includes all the above-mentioned elements that the radio communication system CS includes, except for the user device UE.

Each element in the radio communication system CS performs communication in accordance with a predetermined access technology, e.g., LTE/SAE (Long Term Evolution/System Architecture Evolution) specified in the 3GPP (Third Generation Partnership Project) protocols. In accordance with terms specified in the 3GPP protocols, the user device UE is a User Equipment, the first base station eNB is an evolved Node B, the switching center MME is a Mobile Management Entity, and the gateway device GW is a Packet-Data-Network/Serving Gateway, i.e., an SAE gateway. The second base station PhNB is a base station whose control functions depend entirely or partly on the first base station eNB (details below).

In the present embodiment, the radio communication system CS basically operates in accordance with LTE/SAE, but it is not intended to limit the technical scope of the present invention. The present invention can be used with other access technologies with necessary design modifications.

The user device UE can perform radio communication with the first base station eNB and with the second base station PhNB. A scheme for radio data transmission between the user device UE and each of the base stations (eNB, PhNB) can be freely chosen. For example, OFDMA (Orthogonal Frequency Division Multiple Access) may be adopted for downlink, whereas SC-FDMA (Single-Carrier Frequency Division Multiple Access) may be adopted for uplink.

The first base station eNB is wire-connected to the second base station PhNB, to the switching center MME, and to the gateway device GW. The second base station PhNB is wire-connected to the first base station eNB and to the gateway device GW. The gateway device GW is connected to an internet IN that is an external network of the radio communication system CS, as well as to the first base station eNB and to the switching center MME. That is, the gateway device GW can function as a connecting point (an access point) to the external network.

1-2. Exchange of User Signals and Control Signals

Description of an exchange of user signals and that of control signals in the radio communication system CS is given. In FIG. 1, solid lines indicate paths used to exchange user signals (signals that indicate user data such as audio signals and data signals) and dashed lines indicate paths used to exchange control signals. In other words, the solid lines indicate interfaces of a U-plane (user plane) and the dashed lines indicate interfaces of a C-plane (control plane). A U-plane path is established through the interfaces of the U-plane and a C-plane path is established through the interfaces of the C-plane.

For the above-mentioned interfaces, a protocol architecture of EPS (Evolved Packet System) specified by 3GPP is adopted. In the above configuration, there is an X3 interface between the first base station eNB and the second base station PhNB, and there is a Ph-Uu interface between the second base station PhNB and the user device UE. There is no C-plane interface between the second base station PhNB and the user device UE.

Figure 2:
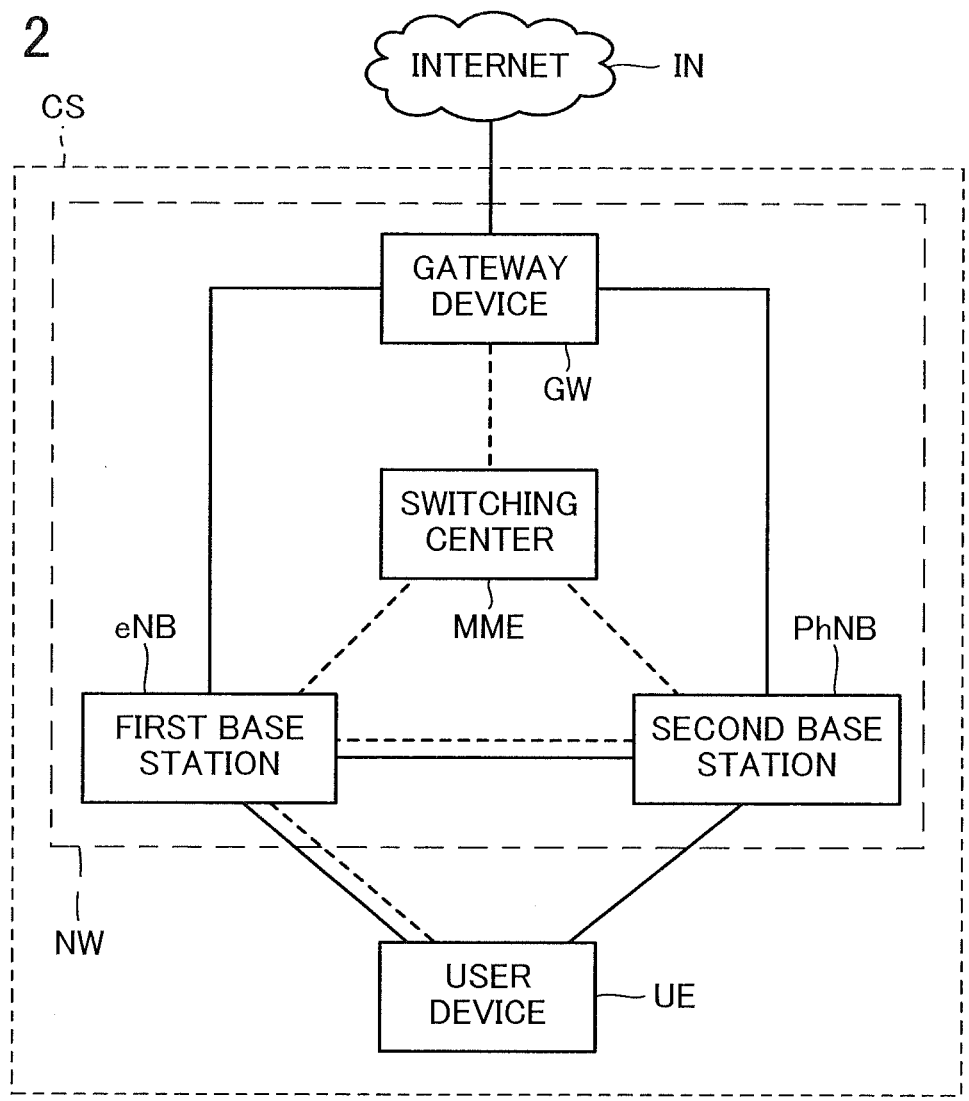
FIG. 2 is a block diagram illustrating another configuration of the radio communication system.

As shown in FIG. 2, a configuration may be adopted in which there is a C-plane interface (an S1-MME interface) between the switching center MME and the second base station PhNB. Alternatively, a configuration may be adopted in which among multiple second base stations PhNB included in the radio communication system CS, some second base stations PhNB are not connected to the switching center MME as in FIG. 1 and other second base stations PhNB are connected to the switching center MME as in FIG. 2.

The user device UE can exchange user signals with the internet IN using two U-plane paths. That is, the user device UE can communicate user data using a U-plane path that leads from the user device UE through the first base station eNB and the gateway device GW to the internet IN and a U-plane path that leads from the user device UE through the second base station PhNB and the gateway device GW to the internet IN.

In the radio communication system CS, user signals are exchanged using a bearer, which is a logical path. A bearer (EPS bearer) is established between the user device UE and the gateway device GW based on control by the switching center MME (a control signal transmitted by the switching center MME). More specifically, an EPS bearer includes a radio bearer RB and an S1 bearer S1B. A radio bearer RB is a bearer established between the user device UE and the base stations (the first base station eNB, the second base station PhNB), and an S1 bearer S1B is a bearer established between the base stations (the first base station eNB, the second base station PhNB) and the gateway device GW. The path of an established EPS bearer (U-plane path) can be switched based on the control by the switching center MME.

1-3. Handover According to Conventional Technologies

Figure 3:
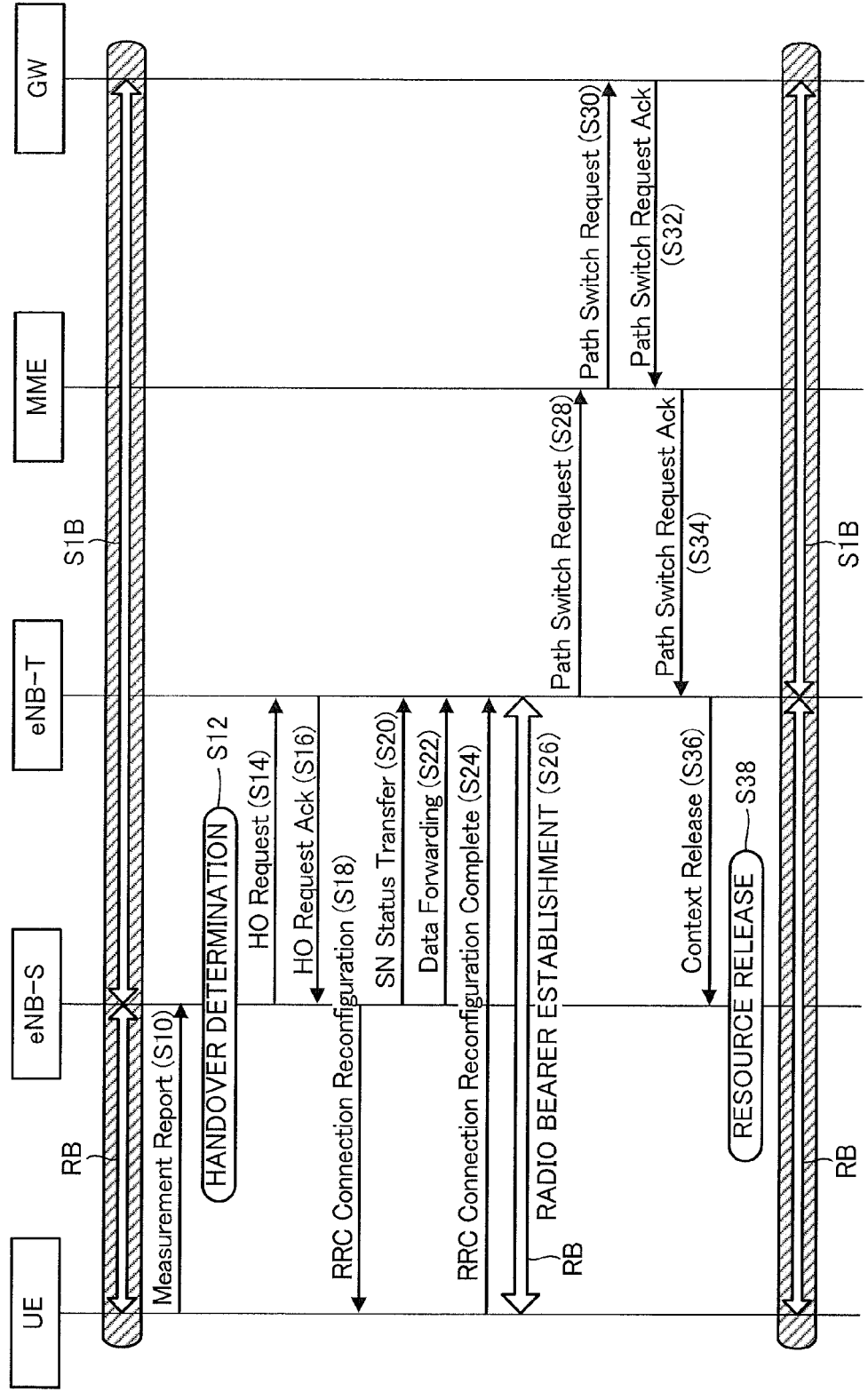
FIG. 3 is an operation flow illustrating an example of a handover and path switching according to conventional technologies.

Before describing a handover and path switching according to the present invention, an example of a handover and path switching according to conventional technologies is described with reference to FIG. 3. In the example shown in FIG. 3, a U-plane path is assumed to have been established between the user device UE and the gateway device GW through a source base station eNB-S that is to be a handover source. By the operations described below, the path of the U-plane path is switched so that the U-plane path passes through a target base station eNB-T that is to be a handover destination.

The user device UE measures and reports received power (received quality) of radio waves transmitted by neighboring base stations to the source base station eNB-S to which the user device UE is currently connected. More specifically, the user device UE transmits a Measurement Report message (a measurement report message) that carries information indicating received power (received quality) of radio waves (radio signals) received from neighboring base stations to the source base station eNB-S through a C-plane path (a Signaling Radio Bearer) (S10).

After receiving the Measurement Report message from the user device UE, the source base station eNB-S make a determination whether it should cause the user device UE to be handed over (S12). An example of the above determination is a determination "whether received power of radio waves from another base station eNB is greater than that of radio waves from the source base station eNB-S to which the user device UE is currently connected (the source base station eNB-S in the range of which the user device is present)." In the present example, at step S12, the source base station eNB is assumed to have determined that received power from another base station eNB (a target base station eNB-T) is greater than that from the source base station eNB-S and determined that it should cause the user device UE to be handed over to the target base station eNB-T.

After making the determination at step S12, the source base station eNB transmits, to the target base station eNB-T through an X2 interface (an interface of a base station eNB), a Handover Request message (a handover request message) requesting that the user device UE be handed over to the target base station eNB-T (S14). The Handover Request message includes information of a bearer that has already been established through the source base station eNB and that of a bearer that is to be established through the target base station eNB-T (including QoS information of the bearer to be established).

After receiving the Handover Request message, if the target base station eNB-T can accommodate the user device UE, the target base station eNB-T transmits a Handover Request Ack message (a handover request acknowledgement message) to the source base station eNB-S through the X2 interface (S16). The Handover Request Ack message is a message indicating that a handover based on the Handover Request message can be performed and includes a parameter necessary for the user device UE to connect to the target base station eNB-T. If the target base station eNB-T cannot accommodate the user device UE, the target base station eNB-T transmits a Handover Preparation Failure message to the source base station eNB-S, and procedure is repeated from the step at which a Measurement Report message is received (S10).

After receiving the Handover Request Ack message, the source base station eNB-S transmits, to the user device UE, which is currently connected to its own station, an RRC Connection Reconfiguration message (a radio connection reconfiguration message) commanding that a radio bearer RB be established between the target base station eNB-T and the user device UE (S18). The RRC Connection Reconfiguration message includes a parameter (e.g., identification information of the target base station eNB-T) necessary for the user device UE to wirelessly connect to the target base station eNB-T.

The source base station eNB-S transmits an SN Status Transfer message to the target base station eNB-T (S20) and performs a data transfer (Data Forwarding) (S22). The SN Status Transfer message includes information such as a PDCP sequence number status (a PDCP SN Status). The two steps described immediately above may be omitted.

The user device UE, in accordance with the received RRC Connection Reconfiguration message, reconfigures settings of its own device so as to establish a radio bearer RB to the target base station eNB-T. After confirming a successful access to the target base station eNB-T, the user device UE transmits an RRC Connection Reconfiguration Complete message (a radio connection reconfiguration complete message) to the target base station eNB-T (S24). It should be noted that, for the user device UE, the transmitting source of an RRC Connection Reconfiguration message (the source base station eNB-S that gave a command for the handover) is different from the transmitting destination of an RRC Connection Reconfiguration Complete message (the target base station eNB-T).

After establishment of the radio bearer RB to the target base station eNB-T is completed (S26), the target base station eNB-T transmits a Path Switch Request message (a path switching request message) to the switching center MME (S28). The Path Switch Request message is a control message requesting that the U-plane path established through the source base station eNB-S be changed so that the U-plane path passes through the target base station eNB-T. The Path Switch Request message includes identification information (an IP address and a TEID (tunnel endpoint identifier)) of the target base station eNB-T, i.e., its own station.

After receiving the Path Switch Request message from the target base station eNB-T, the switching center MME transmits the Path Switch Request message to the gateway device GW (S30). After receiving the Path Switch Request message, the gateway device GW reconfigures settings of its own device using the identification information of the target base station eNB-T so that the U-plane path established with the gateway device GW as one endpoint passes through the target base station eNB-T. Then, the gateway device GW transmits a Path Switch Request Ack message (a path switching request acknowledgement message) to the switching center MME (S32).

After receiving the Path Switch Request Ack message from the gateway device GW, the switching center MME transmits the Path Switch Request Ack message to the target base station eNB-T (S34). After receiving the Path Switch Request Ack message, the target base station eNB-T transmits a Context Release message (a context release message) to the source base station eNB-S (S36). The Context Release message is a message that indicates success of the handover and informs the source base station eNB-S that the source base station eNB-S may release a communication resource (the U-plane path, the C-plane path, etc.) secured by the source base station eNB-S. After receiving the Context Release message, the source base station eNB-S releases the communication resource that the source base station eNB-S has secured for the user device UE to communicate (S38).

By the operation described above, a radio connection destination of the user device UE is changed from the source base station eNB-S to the target base station eNB-T, and the path of the U-plane path (bearer) established through the source base station eNB-S is switched so that the U-plane path passes through the target base station eNB-T.

1-4. Handover of Present Embodiment

Figure 4:
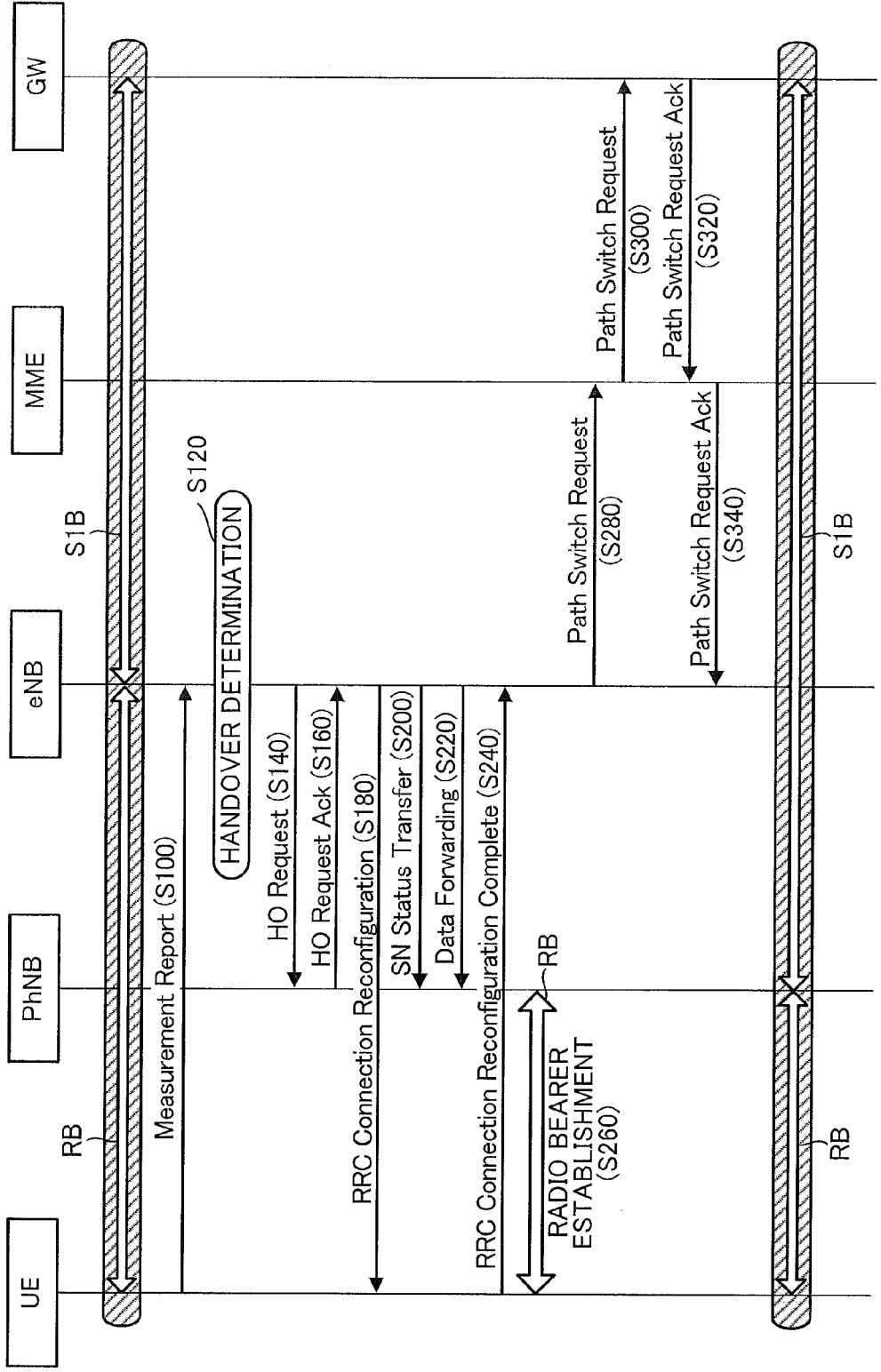
FIG. 4 is an operation flow illustrating an example of a handover operation according to the first embodiment.

In the conventional handover operation described above, a handover source and a handover destination are eNB. The source base station eNB-S and the target base station eNB-T can exchange control signals with each other and can exchange control signals with the user device UE. On the other hand, as described above, the second base station PhNB of the present embodiment does not exchange control signals with the user device UE. Therefore, in order to for the user device UE to be handed over from the first base station eNB to the second base station PhNB, it can be understood that a handover operation that is different from the conventional operation is necessary. With reference to FIG. 4, an example of a handover operation in the radio communication system CS according to the present embodiment is described below. Control messages used in the example below have configurations similar to those with the same name in the conventional handover operation described above, unless otherwise stated.

In the present example (FIG. 4), it is assumed that the user device UE is connected to the first base station eNB by radio and a U-plane path has been established through the first base station eNB. That is, the first base station eNB is the source base station. The user device UE transmits a Measurement Report message to the first base station eNB, which is the source base station (S100). Based on received power that is from a base station and is indicated by the received Measurement Report message, the first base station eNB makes a determination whether it should cause the user device UE to be handed over (S120). In the present example, the first base station eNB is assumed to have determined that it should cause the user device UE to be handed over to the second base station PhNB. That is, the second base station PhNB is the target base station.

After making the determination at step S120, the first base station eNB transmits, to the second base station PhNB through an X3 interface (an interface connecting the first base station eNB and the second base station PhNB), a Handover Request message requesting that the user device UE be handed over to the second base station PhNB (S140). After receiving the Handover Request message, if the second base station PhNB can accommodate the user device UE, the second base station PhNB transmits a Handover Request Ack message to the first base station eNB through the X3 interface (S160).

After receiving the Handover Request Ack message, the first base station eNB transmits, to the user device UE, which is currently connected to its own station, an RRC Connection Reconfiguration message commanding that a radio bearer RB be established between the second base station PhNB and the user device UE (S180). The first base station eNB transmits an SN Status Transfer message to the second base station PhNB (S200) and performs a data transfer (Data Forwarding) (S220). As stated before, the above two steps (S200 and S220) may be omitted.

The user device UE, in accordance with the received RRC Connection Reconfiguration message, reconfigures settings of its own device so as to establish a radio bearer RB to the second base station PhNB. After confirming a successful access to the second base station PhNB, the user device UE transmits an RRC Connection Reconfiguration Complete message to the first base station eNB (not to the second base station PhNB) (S240). It should be noted that, unlike in the conventional handover operation, the transmitting source of the RRC Connection Reconfiguration message and the transmitting destination of the RRC Connection Reconfiguration Complete message are the same (the first base station eNB).

After establishment of the radio bearer RB to the second base station PhNB is completed (S260), the first base station eNB transmits, to the switching center MME, a Path Switch Request message requesting that the U-plane path established between the user device UE and the gateway device GW through the first base station eNB be changed so that the U-plane path passes through the second base station PhNB (S280). The Path Switch Request message includes, not identification information of its own station, but identification information (an IP address and a TEID) of the second base station PhNB, which is a new point through which the U-plane path passes. After receiving the Path Switch Request message from the first base station eNB, the switching center MME transmits the Path Switch Request message to the gateway device GW (S300).

Based on the received Path Switch Request message, the gateway device GW reconfigures settings of its own device using the identification information of the second base station PhNB so that the U-plane path established with the gateway device GW as one endpoint passes through the second base station PhNB. Then, the gateway device GW transmits a Path Switch Request Ack message (a path switching request acknowledgement message) to the switching center MIME (S320). After receiving the Path Switch Request Ack message from the gateway device GW, the switching center MME transmits the Path Switch Request Ack message to the first base station eNB (S340).

After receiving the Path Switch Request Ack message, the first base station eNB may delete, as necessary, context information related to the U-plane path that had been established through the first base station eNB. That is, after receiving the Path Switch Request Ack message, the first base station eNB may release a communication resource that the first base station eNB has secured for the user device UE to communicate. However, if a handover according to a third embodiment described below (in particular, the third embodiment itself and its first modification) is to be performed after a handover according to the present embodiment is performed, the above context information may become necessary. Thus, the first base station eNB preferably maintains, rather than deletes, the context information even after performing the handover according to the present embodiment.

As described above, in the handover operation according to the present embodiment, unlike in the conventional handover operation, the first base station eNB, which is the source base station, transmits the RRC Connection Reconfiguration message, and the first base station eNB also receives the RRC Connection Reconfiguration Complete message. Moreover, not the second base station PhNB, which is the target base station, but the first base station eNB, which is the source base station, transmits the Path Switch Request message.

1-5. Modification of Handover of Present Embodiment

Figure 5:
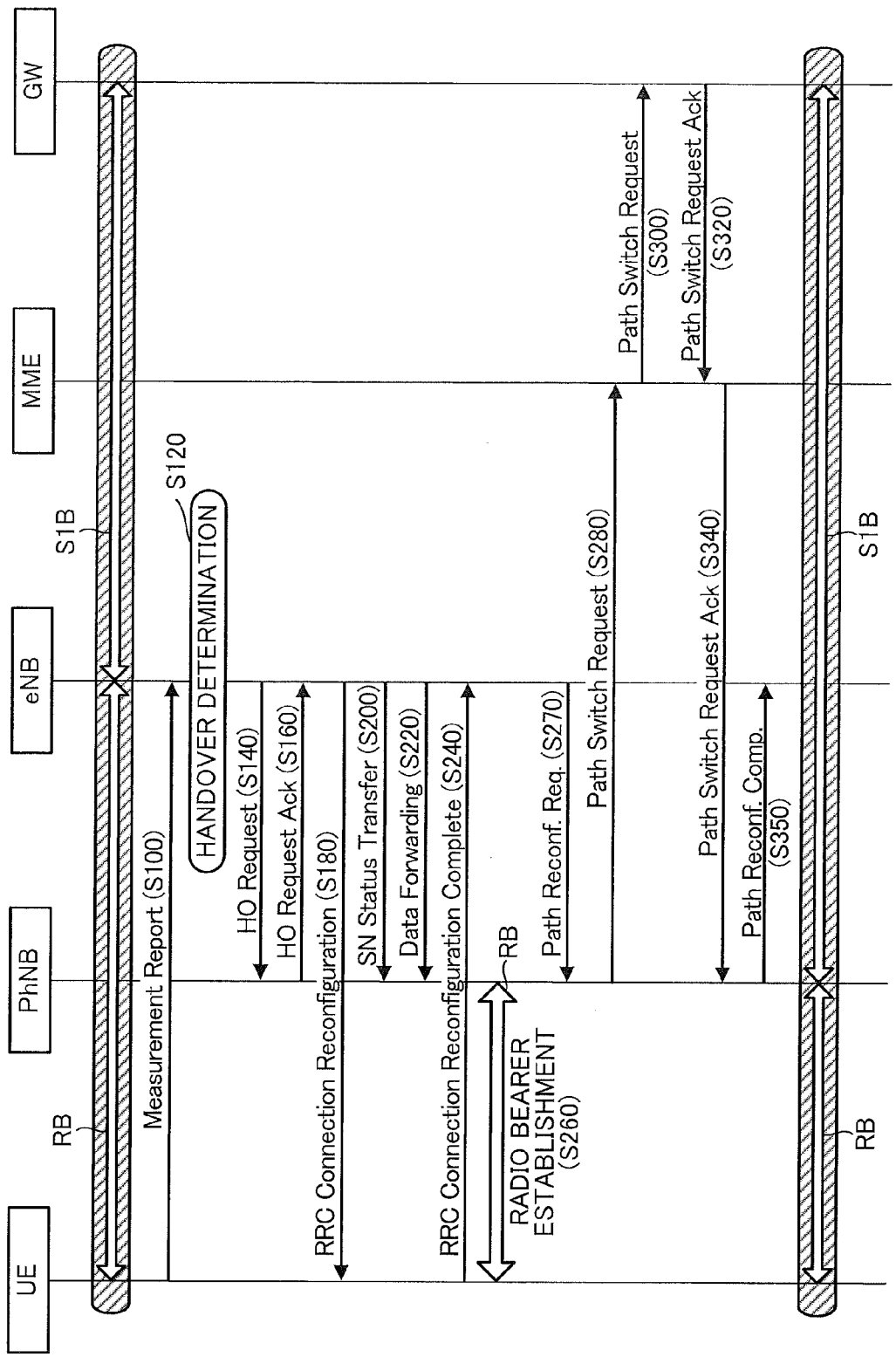
FIG. 5 is an operation flow illustrating a modification of the handover operation according to the first embodiment.

In the above configuration, in which the user device UE is handed over from the first base station eNB to the second base station PhNB, a configuration may be adopted in which the second base station PhNB, which is the target base station, transmits the Path Switch Request message, as shown in FIG. 5.

In the example shown in FIG. 5, after establishment of a radio bearer RB to the second base station PhNB is completed (S260), the first base station eNB transmits a Path Reconfiguration Request message to the second base station PhNB (S270). After receiving the Path Reconfiguration Request message, the second base station PhNB transmits a Path Switch Request message that includes identification information of its own station to the switching center MME. Procedure from a step at which the switching center MME transmits a Path Switch Request message to the gateway device GW (S300) to a step at which the gateway device GW transmits a Path Switch Request Ack message to the switching center MME (S320) is as described above. After receiving the Path Switch Request Ack message from the gateway device GW, the switching center MME transmits the Path Switch Request Ack message to the second base station PhNB (S340). The second base station PhNB transmits a Path Reconfiguration Complete message to the first base station eNB (S350).

After receiving the Path Reconfiguration Complete message, the first base station eNB may delete, as described above, context information related to the U-plane path that had been established through the first base station eNB as necessary. It is also as described above that the first base station eNB preferably maintains the context information.

A configuration may be adopted in which the second base station PhNB does not transmit the Context Release message to the first base station eNB and the first base station eNB deletes the context information based on the Path Reconfiguration Complete message received from the second base station PhNB. In that case, the Path Reconfiguration Complete message preferably includes all or a part of the information that is to be transmitted by the Context Release message.

In the handover operation described above, unlike in the conventional handover operation, the first base station eNB, which is the source base station, transmits the RRC Connection Reconfiguration message, and the first base station eNB also receives the RRC Connection Reconfiguration Complete message. Moreover, the first base station eNB, which is the source base station, transmits the Path Reconfiguration Request message to the second base station PhNB and causes the second base station PhNB to transmit the Path Switch Request message.

1-6. Configuration of Each Element

1-6-1. Configuration of User Device

Figure 6:
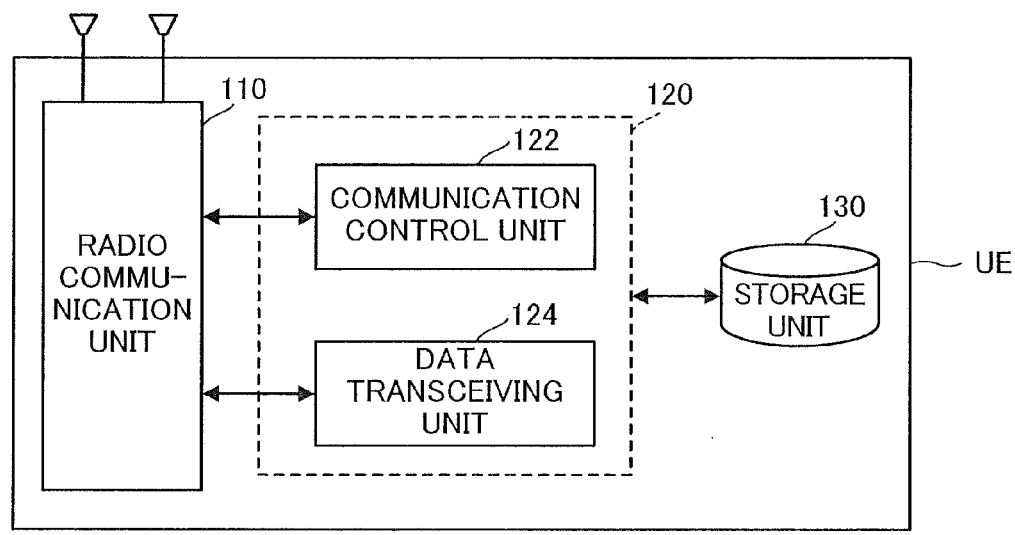
FIG. 6 is a block diagram illustrating a configuration of a user device according to the first embodiment.

FIG. 6 is a block diagram illustrating a configuration of the user device UE according to the present embodiment. The user device UE includes a radio communication unit 110, a control unit 120, and a storage unit 130. In the figure, the illustration of an output device outputting audio, images, etc., and an input device for accepting instructions from a user, etc., are omitted for brevity.

The radio communication unit 110 is an element for performing radio communication with each base station (the first base station eNB, the second base station PhNB), and includes transceiving antennas, a receiving circuit for receiving radio signals (radio waves) and converting them to electrical signals, and a transmitting circuit for converting electrical signals, such as control signals and data signals, to radio signals and transmitting them. The storage unit 130 stores information related to communication control, in particular, identification information of each node, including that of its own device, and context information of a communication path (a C-plane path, a U-plane path).

The control unit 120 includes a communication control unit 122 and a data transceiving unit 124. The communication control unit 122 is an element for controlling communication between the user device UE and each base station (the first base station eNB, the second base station PhNB). The communication control unit 122 exchanges control signals (control messages) with each base station through the radio communication unit 110. That is, the communication control unit 122 performs C-plane communication. For example, as described above, after configuring the radio communication unit 110 and the data transceiving unit 124 so as to establish a radio bearer RB to a new connection destination base station based on a received RRC Connection Reconfiguration message, the communication control unit 122 transmits an RRC Connection Reconfiguration Complete message. Moreover, the communication control unit 122 measures received power of radio waves received from each base station to generate and transmit a Measurement Report message that carries information indicating the received power to the first base station eNB. The data transceiving unit 124 exchanges a data signal with each base station through the radio communication unit 110 using the established bearer. That is, the data transceiving unit 124 performs U-plane communication.

The control unit 120 and the communication control unit 122 and the data transceiving unit 124 included in the control unit 120 are functional blocks performed by a CPU (central processing unit; not shown) in the user device UE executing a computer program stored in the storage unit 130 and operating in accordance with the computer program.

1-6-2. Configuration of First Base Station

Figure 7:
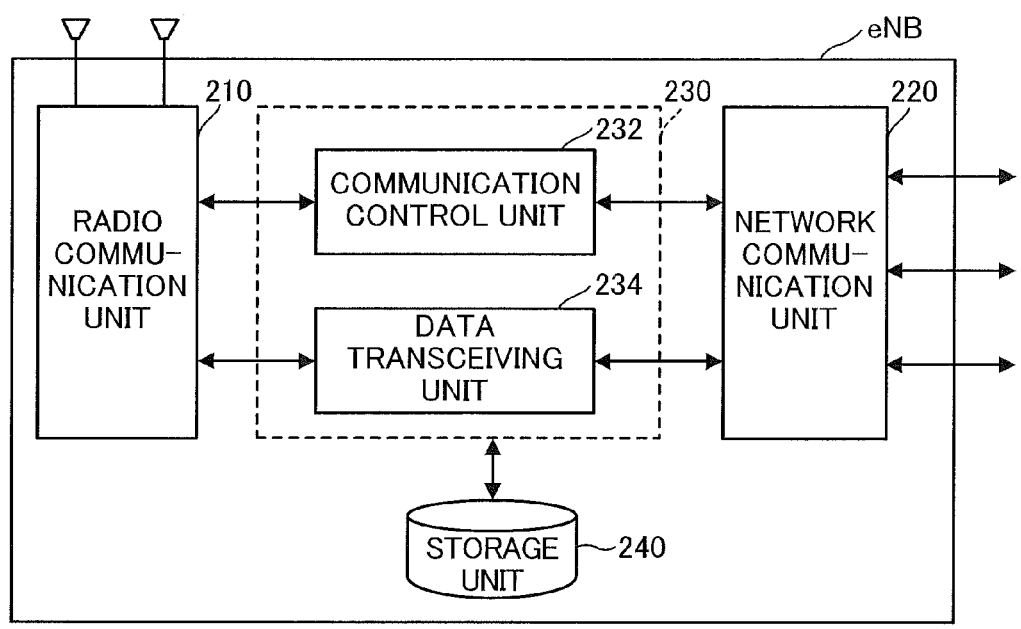
FIG. 7 is a block diagram illustrating a configuration of a first base station according to the first embodiment.

FIG. 7 is a block diagram illustrating a configuration of the first base station eNB according to the present embodiment. The first base station eNB includes a radio communication unit 210, a network communication unit 220, a control unit 230, and a storage unit 240. The radio communication unit 210 is an element for performing radio communication with the user device UE, and has a configuration similar to that of the radio communication unit 110 of the user device UE. The network communication unit 220 is an element for performing communication with other nodes (the second base station PhNB, the switching center MME, the gateway device GW, etc.) in the network NW. The network communication unit 220 exchanges electrical signals with the other nodes by wire or by radio. The storage unit 240 stores information related to communication control, in particular, identification information of each node, including that of its own station, and context information of a communication path (a C-plane path, a U-plane path).

The control unit 230 includes a communication control unit 232 and a data transceiving unit 234. The communication control unit 232 is an element for controlling communication with the user device UE based on its own determination or a command (a control signal) from an upper node (e.g., the switching center MME). The communication control unit 232 exchanges control signals (a Path Switch Request message, etc.) with the second base station PhNB and with the switching center MME through the network communication unit 220 and exchanges control signals with the user device UE through the radio communication unit 210. That is, the communication control unit 232 performs C-plane communication through the network communication unit 220. For example, as described above, the communication control unit 232 determines, based on a Measurement Report message received from the user device UE, whether the user device UE should be handed over. Moreover, the communication control unit 232 transmits an RRC Connection Reconfiguration message to the user device UE so as to perform radio resource control of the user device UE (e.g., establishment of a radio bearer RB). The data transceiving unit 234, using the established bearer, exchanges (relays) user signals with the user device UE through the radio communication unit 210 and exchanges (relays) user signals with the gateway device GW through the network communication unit 220. That is, the data transceiving unit 234 performs U-plane communication.

The control unit 230 and the communication control unit 232 and the data transceiving unit 234 included in the control unit 230 are functional blocks performed by a CPU (not shown) in the first base station eNB executing a computer program stored in the storage unit 240 and operating in accordance with the computer program.

1-6-3. Configuration of Second Base Station

Figure 8:
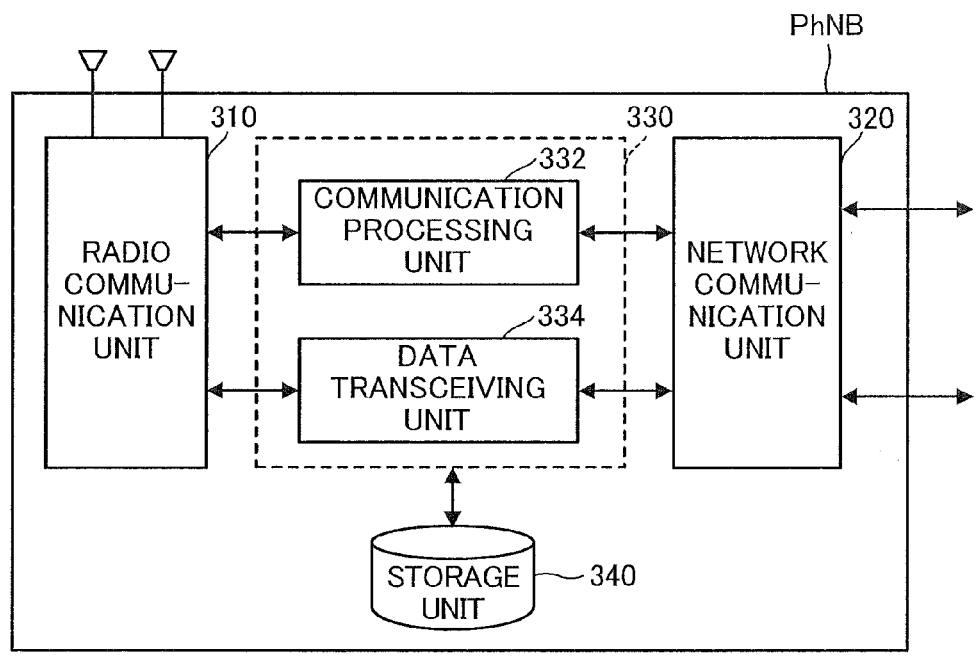
FIG. 8 is a block diagram illustrating a configuration of a second base station according to the first embodiment.

FIG. 8 is a block diagram illustrating a configuration of the second base station PhNB according to the present embodiment. The second base station PhNB includes a radio communication unit 310, a network communication unit 320, a control unit 330, and a storage unit 340. The radio communication unit 310 is an element for performing radio communication with the user device UE, and has a configuration similar to that of the radio communication unit 210 of the first base station eNB. The network communication unit 320 is an element for performing communication with the first base station eNB. The network communication unit 320 exchanges electrical signals with the first base station eNB by wire or by radio. In the configuration shown in FIG. 2 in which the second base station PhNB and the switching center MME are connected, the network communication unit 320 exchanges electrical signals also with the switching center MME. The storage unit 340 stores information related to communication control, in particular, identification information of each node, including that of its own station, and context information of a communication path.

The control unit 330 includes a communication processing unit 332 and a data transceiving unit 334. The communication processing unit 332 is an element for responding to a command (a control signal) from an upper node (the first base station eNB). The communication processing unit 332 exchanges control signals with the first base station eNB through the network communication unit 320. That is, the communication processing unit 332 performs C-plane communication through the network communication unit 320. For example, as described above, the communication processing unit 332 receives a Handover Request message from the first base station eNB and determines whether the user device UE can be accommodated. Then, the communication processing unit 332 transmits a Handover Request Ack message to the first base station eNB. The communication processing unit 332 does not perform radio resource control of the user device UE. The data transceiving unit 334, using the established bearer, exchanges (relays) user signals with the user device UE through the radio communication unit 310 and exchanges (relays) user signals with the gateway device GW through the network communication unit 320. That is, the data transceiving unit 334 performs U-plane communication.

The control unit 330 and the communication processing unit 332 and the data transceiving unit 334 included in the control unit 330 are functional blocks performed by a CPU (not shown) in the second base station PhNB executing a computer program stored in the storage unit 340 and operating in accordance with the computer program.

1-6-4. Configuration of Switching Center

Figure 9:
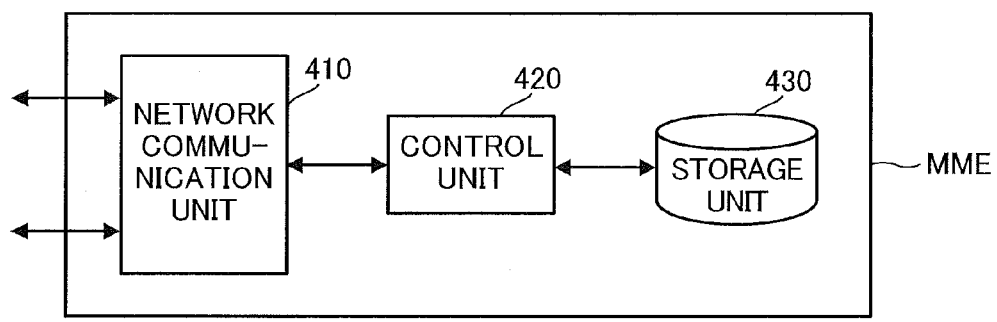
FIG. 9 is a block diagram illustrating a configuration of a switching center according to the first embodiment.

FIG. 9 is a block diagram illustrating a configuration of the switching center MME according to the present embodiment. The switching center MME includes a network communication unit 410, a control unit 420, and a storage unit 430. The network communication unit 410 is an element for performing communication with other nodes (the first base station eNB, the second base station PhNB, the gateway device GW, etc.) in the network NW. The network communication unit 410 has a configuration similar to that of the network communication unit 220 of the first base station eNB. The storage unit 430 stores information related to communication control, in particular, identification information of each node, including that of its own center, and context information of a communication path (a C-plane path, a U-plane path).

The control unit 420 functions as a communication control unit. The control unit 420 is an element for performing communication control of the radio communication system CS. The control unit 420 exchanges control signals (a Path Switch Request message, etc.) with the first base station eNB, with the second base station PhNB, and with the gateway device GW, etc. through the network communication unit 410. That is, the control unit 420 performs C-plane communication through the network communication unit 410 so as to control (establish, switch the path of, etc.) a logical communication path (a C-plane path, a U-plane path). For example, as described above, based on a Path Switch Request message received from the first base station eNB, the control unit 420 transmits a Path Switch Request message to the gateway device GW. The switching center MME (the control unit 420) performs C-plane communication and does not perform U-plane communication.

The control unit 420 is a functional block performed by a CPU (not shown) in the switching center MME executing a computer program stored in the storage unit 430 and operating in accordance with the computer program.

1-6-5. Configuration of Gateway Device

Figure 10:
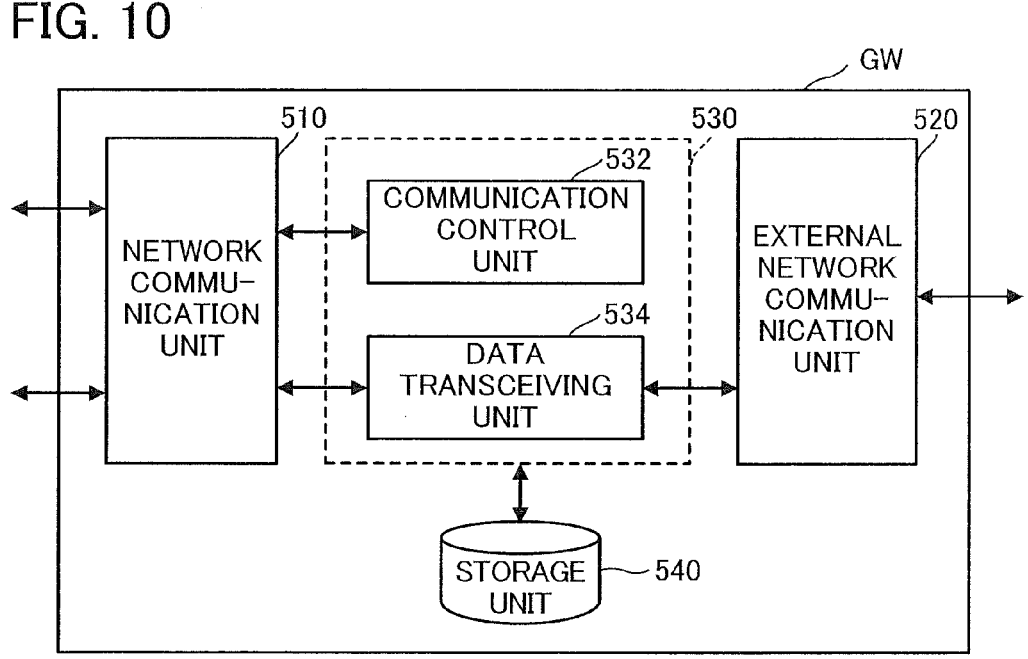
FIG. 10 is a block diagram illustrating a configuration of a gateway device according to the first embodiment.

FIG. 10 is a block diagram illustrating a configuration of the gateway device GW according to the present embodiment. The gateway device GW includes a network communication unit 510, an external network communication unit 520, a control unit 530, and a storage unit 540. The network communication unit 510 is an element for performing communication with other nodes (the first base station eNB, the second base station PhNB, the switching center MME, etc.) in the network NW. The network communication unit 510 has a configuration similar to that of the network communication unit 220 of the first base station eNB. The external network communication unit 520 is an element for performing communication with the internet IN, and performs protocol conversion of user signals as necessary. The storage unit 540 stores information related to communication control, in particular, identification information of each node, including that of its own center, and context information of a communication path (a C-plane path, a U-plane path).

The control unit 530 includes a communication control unit 532 and a data transceiving unit 534. The communication control unit 532 is an element for performing communication control of the radio communication system CS based on its own determination or a command (a control signal) from another node (e.g., the switching center MME). The communication control unit 532 exchanges control signals with the switching center MME through the network communication unit 510. That is, the communication control unit 532 performs C-plane communication through the network communication unit 510. For example, the communication control unit 532 switches the path of a U-plane based on a Path Switch Request message received from the switching center MME, and transmits a Path Switch Request Ack message to the switching center MME. The data transceiving unit 534 transmits (relays) user signals that are originated from the user device UE and are received through the network communication unit 510 to the internet IN (an external server in the internet IN) though the external network communication unit 520, and transmits (relays) user signals received through the external network communication unit 520 from the internet IN (the external server in the internet IN) to the user device UE through the network communication unit 510.

The control unit 530 and the communication control unit 532 and the data transceiving unit 534 included in the control unit 530 are functional blocks performed by a CPU (not shown) in the gateway device 500 executing a computer program stored in the storage unit 540 and operating in accordance with the computer program.

1-7. Advantages of Present Embodiment

According to the first embodiment described above, the first base station eNB transmits an RRC Connection Reconfiguration message to the user device UE and receives an RRC Connection Reconfiguration Complete message from the user device UE. Therefore, a U-plane path can be established through the second base station PhNB, which does not perform radio resource control of the user device UE (has limited control functions). Accordingly, it is made possible for the user device UE to be handed over to the second base station PhNB as a target base station. In particular, in a configuration in which the first base station eNB, which is a source base station, transmits a Path Switch Request message to the switching center MME, even when it has a system configuration in which the second base station PhNB and the switching center MME are not connected, the user device UE can be handed over to the second base station PhNB as the target base station.

Second Embodiment

Description is next given of a second embodiment of the present invention. In each embodiment described below, for elements for which operation and function are equivalent to those of the first embodiment, the reference symbols used in the above description are used, and description thereof will be omitted as appropriate.

2-1. Handover of Present Embodiment

Figure 11:
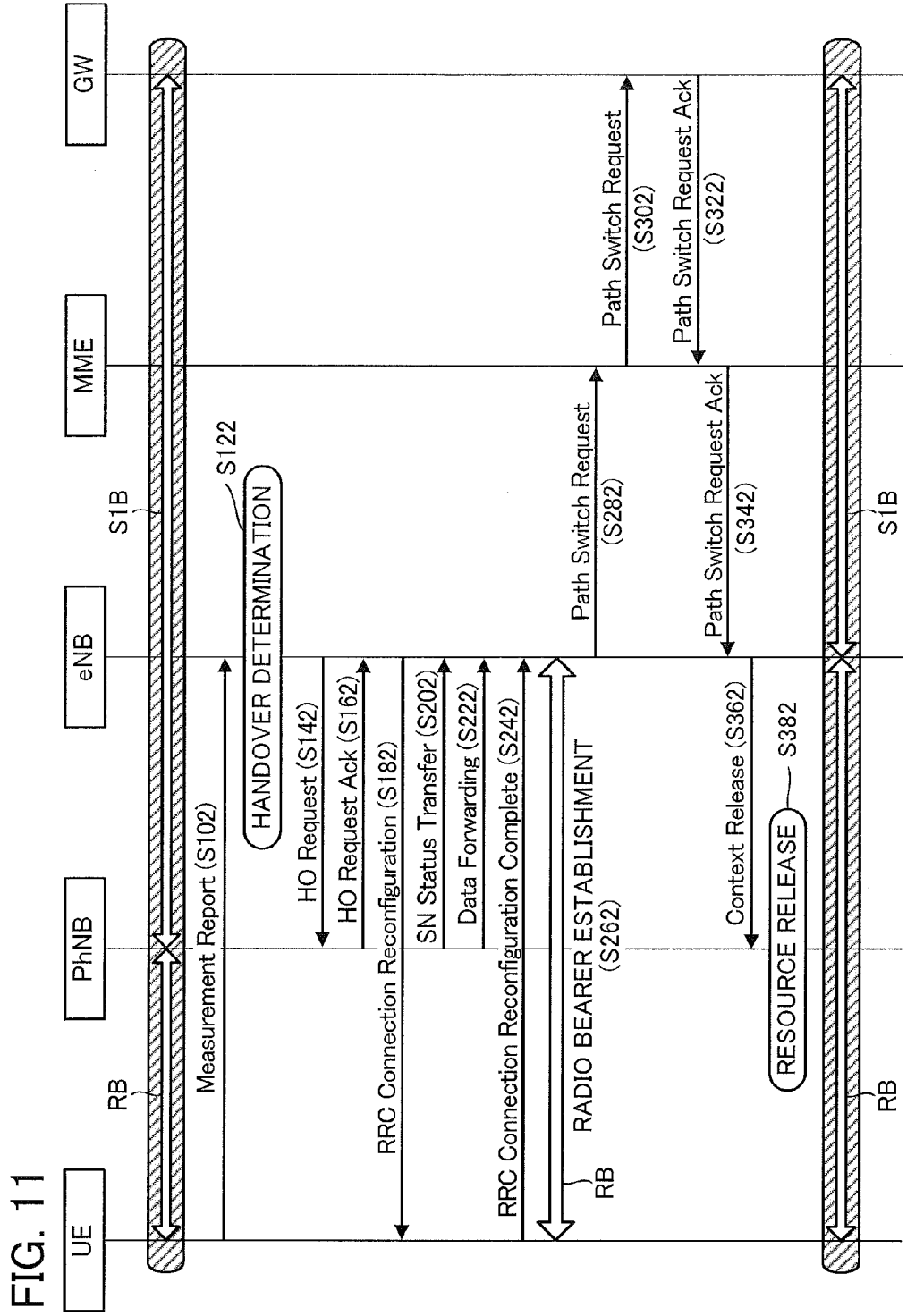
FIG. 11 is an operation flow illustrating an example of a handover operation according to a second embodiment.

In the first embodiment, the user device UE is handed over from the first base station eNB to the second base station PhNB. In the second embodiment, the user device UE is handed over from the second base station PhNB to the first base station eNB. With reference to FIG. 11, an example of a handover operation in the radio communication system CS according to the present embodiment is described below.

In the present example (FIG. 11), a U-plane path is assumed to have been established between the user device UE and the gateway device GW through the second base station PhNB. Additionally, a C-plane path (a signaling radio bearer) is assumed to have been established between the first base station eNB and the user device UE.

The user device UE transmits a Measurement Report message to the first base station eNB through the C-plane path (S102). Based on received power that is from a base station and is indicated by the received Measurement Report message, the first base station eNB makes a determination whether it should cause the user device UE to be handed over (S122). In the present example, the first base station eNB is assumed to be able to accommodate the user device UE and to have determined that it should cause the user device UE to be handed over from the second base station PhNB to the first base station eNB. That is, the second base station PhNB is the source base station and the first base station eNB is the target base station.

After making the determination at step S122, the first base station eNB transmits, to the second base station PhNB through the X3 interface, a Handover Request message requesting that the user device UE be handed over to the first base station eNB (S142). After receiving the Handover Request message, the second base station PhNB transmits a Handover Request Ack message to the first base station eNB through the X3 interface (S162).

After receiving the Handover Request Ack message, the first base station eNB transmits an RRC Connection Reconfiguration message commanding that a radio bearer RB be established between the first base station eNB and the user device UE to the user device UE, which is currently connected, in terms of the C-plane, to its own station (S182). The second base station PhNB transmits an SN Status Transfer message to the first base station eNB (S202) and performs a data transfer (Data Forwarding) (S222). As stated before, the above two steps (S202 and S222) may be omitted.

The user device UE, in accordance with the received RRC Connection Reconfiguration message, reconfigures settings of its own device so as to establish a radio bearer RB to the first base station eNB. After confirming a successful access to the first base station eNB, the user device UE transmits an RRC Connection Reconfiguration Complete message to the first base station eNB (S242). It should be noted that, unlike in the conventional handover operation, the transmitting source of the RRC Connection Reconfiguration message and the transmitting destination of the RRC Connection Reconfiguration Complete message are the same (the first base station eNB).

After establishment of the radio bearer RB to the first base station eNB is completed (S262), the first base station eNB transmits, to the switching center MME, a Path Switch Request message requesting that the U-plane path established between the user device UE and the gateway device GW through the second base station PhNB be changed so that the U-plane path passes through the first base station eNB (S282). The Path Switch Request message includes identification information of its own station (the first base station eNB), which is a new point through which the U-plane path passes. After receiving the Path Switch Request message from the first base station eNB, the switching center MME transmits the Path Switch Request message to the gateway device GW (S302).

Based on the received Path Switch Request message, the gateway device GW reconfigures settings of its own device using the identification information of the first base station eNB so that the U-plane path established with the gateway device GW as one endpoint passes through the first base station eNB. Then, the gateway device GW transmits a Path Switch Request Ack message to the switching center MME (S322). After receiving the Path Switch Request Ack message from the gateway device GW, the switching center MME transmits the Path Switch Request Ack message to the first base station eNB (S342).

After receiving the Path Switch Request Ack message, the first base station eNB transmits a Context Release message to the second base station PhNB (S362). After receiving the Context Release message, the second base station PhNB deletes context information related to the U-plane path that had been established through the second base station PhNB (S382).

In the handover operation described above, unlike in the conventional handover operation, the first base station eNB, which is the target base station, transmits the RRC Connection Reconfiguration message, and the first base station eNB also receives the RRC Connection Reconfiguration Complete message.

2-2. Advantages of Present Embodiment

According to the second embodiment described above, the first base station eNB transmits an RRC Connection Reconfiguration message to the user device UE and receives an RRC Connection Reconfiguration Complete message from the user device UE. Therefore, even when a U-plane path is established through the second base station PhNB, which does not perform radio resource control of the user device UE (has limited control functions) (i.e., even if the second base station PhNB is the source base station), the user device UE can be handed over to the first base station eNB, which is the target base station.

Third Embodiment

Description is next given of the third embodiment of the present invention. In the first and the second embodiments, either the handover source base station or the handover destination base station is an evolved Node B (the first base station eNB). In the third embodiment, both the handover source base station and the handover destination base station are base stations with limited control functions (the second base station PhNB in the first and the second embodiments).

3-1. Configuration of Radio Communication System

Figure 12:
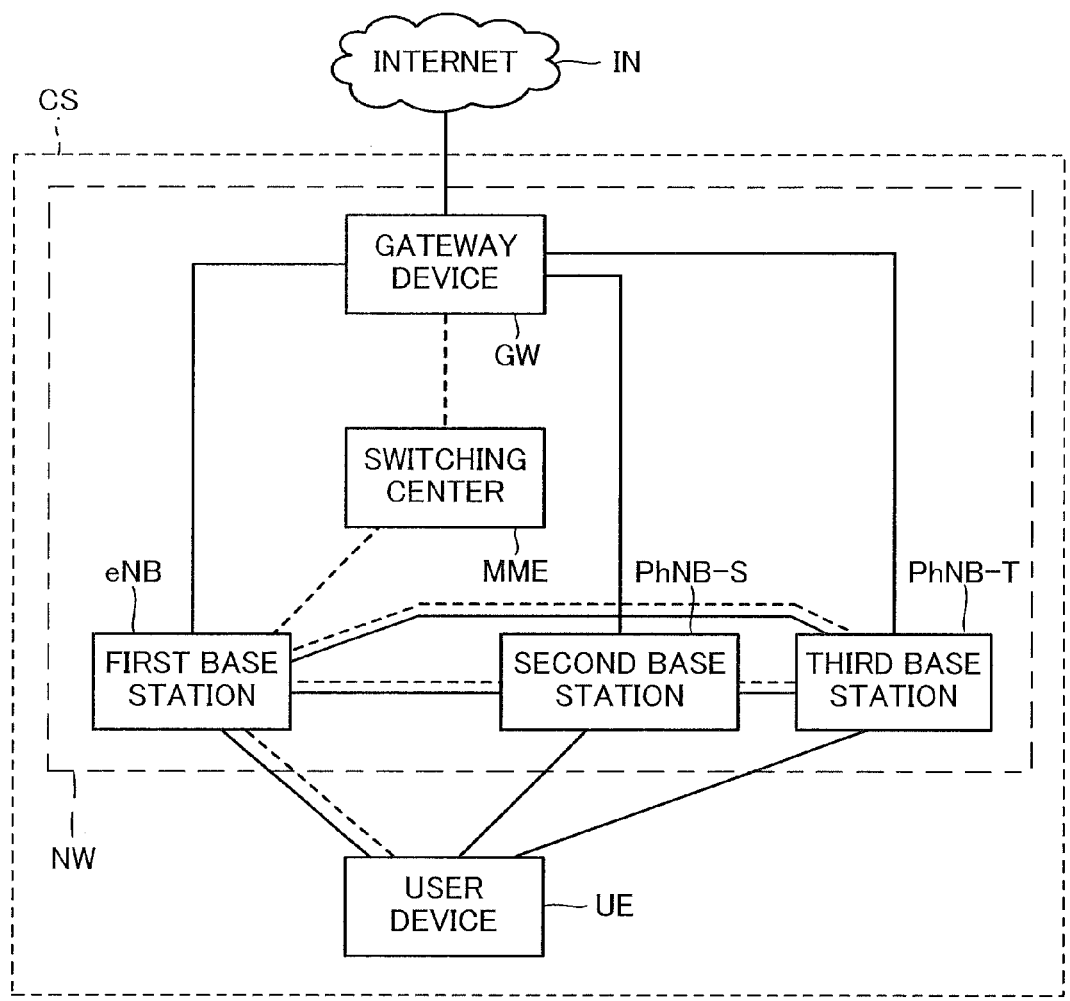
FIG. 12 is a block diagram illustrating a radio communication system according to a third embodiment.

FIG. 12 is a block diagram of a radio communication system CS according to the third embodiment of the present invention. The radio communication system CS according to the third embodiment includes a third base station PhNB-T, in addition to the elements that the radio communication system CS according to the first embodiment includes. A configuration of the third base station PhNB-T is similar to that of the second base station PhNB described above. In order to distinguish between the reference symbol of the third base station PhNB-T and that of the second base station PhNB, the letter S is added to the reference symbol of the second base station PhNB (i.e., hereinafter referred to as the second base station PhNB-S).

The third base station PhNB-T can perform radio communication with the user device UE. The third base station PhNB-T is wire-connected to the first base station eNB, to the second base station PhNB-S, and to the gateway device GW. There is an X4 interface between the second base station PhNB-S and the third base station PhNB-T. As in the case with the second base station PhNB-S, there is no C-plane interface between the third base station PhNB-T and the user device UE.

3-2. Handover of Present Embodiment

Figure 13:
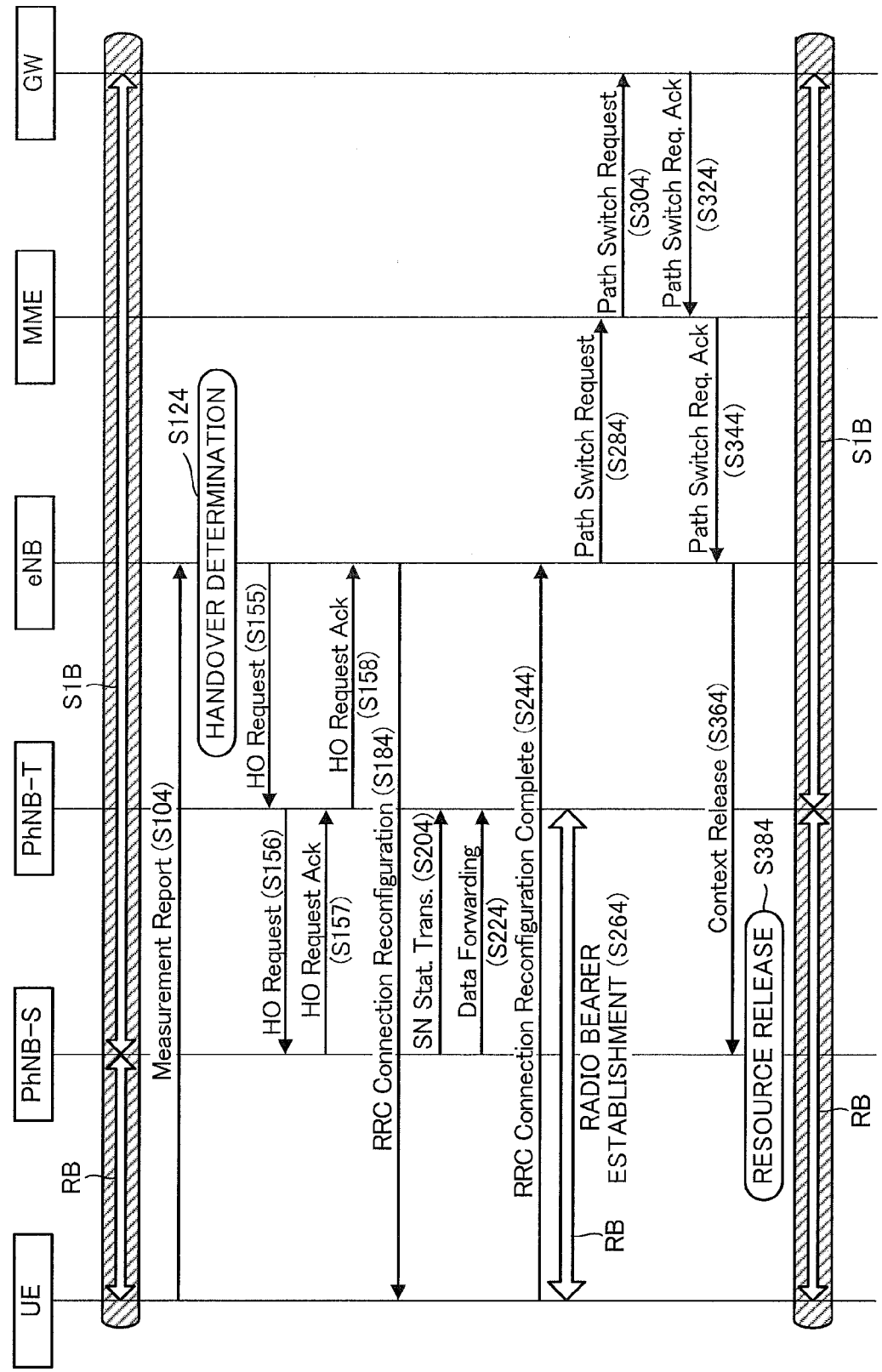
FIG. 13 is an operation flow illustrating an example of a handover operation according to the third embodiment.

In the third embodiment, the user device UE is handed over from the second base station PhNB-S to the third base station PhNB-T. With reference to FIG. 13, an example of a handover operation in the radio communication system CS according to the present embodiment is described below.

In the present example (FIG. 13), a U-plane path is assumed to have been established between the user device UE and the gateway device GW through the second base station PhNB-S. Additionally, a C-plane path (a signaling radio bearer) is assumed to have been established between the first base station eNB and the user device UE.

The user device UE transmits a Measurement Report message to the first base station eNB through the C-plane path (S104). Based on received power that is from a base station (the second base station PhNB-S, the third base station PhNB-T, etc.) and is indicated by the received Measurement Report message, the first base station eNB makes a determination whether it should cause the user device UE to be handed over (S124). In the present example, the first base station eNB is assumed to have determined that it should cause the user device UE to be handed over from the second base station PhNB-S to the third base station PhNB-T. That is, the second base station PhNB-S is the source base station and the third base station PhNB-T is the target base station.

After making the determination at step S124, the first base station eNB transmits a Handover Request message to the third base station PhNB-T through the X3 interface (S155). The Handover Request message includes identification information of the second base station PhNB-S, which is the source base station, and identification information of the gateway device GW, and requests that the user device UE be handed over from the second base station PhNB-S to the third base station PhNB-T. After receiving the Handover Request message, if the third base station PhNB-T can accommodate the user device UE, the third base station PhNB-T transmits a Handover Request message to the second base station PhNB-S through the X4 interface (S156).

After receiving the Handover Request message, the second base station PhNB-S transmits a Handover Request Ack message to the third base station PhNB-T through the X4 interface (S157). After receiving the Handover Request Ack message, the third base station PhNB-T transmits a Handover Request Ack message to the first base station eNB through the X3 interface (S158).

The Handover Request Ack message transmitted at step S157 may include the identification information of the gateway device GW. In that case, the Handover Request message transmitted at step S155 does not need to include the identification information of the gateway device GW. In other words, either the Handover Request message transmitted at step S155 or the Handover Request Ack message transmitted at step S157 includes the identification information of the gateway device GW. As a result, the identification information of the gateway device GW is transmitted to the third base station PhNB-T.

After receiving the Handover Request Ack message, the first base station eNB transmits an RRC Connection Reconfiguration message commanding that a radio bearer RB be established between the third base station PhNB-T and the user device UE to the user device UE, which is currently connected, in terms of the C-plane, to its own station (S184). The second base station PhNB-S transmits an SN Status Transfer message to the third base station PhNB-T (S204) and performs a data transfer (Data Forwarding) (S224). As stated before, the above two steps (S204 and S224) may be omitted.

The user device UE, in accordance with the received RRC Connection Reconfiguration message, reconfigures settings of its own device so as to establish a radio bearer RB to the third base station PhNB-T. After confirming a successful access to the third base station PhNB-T, the user device UE transmits an RRC Connection Reconfiguration Complete message to the first base station eNB (S244). It should be noted that, unlike in the conventional handover operation, the transmitting source of the RRC Connection Reconfiguration message and the transmitting destination of the RRC Connection Reconfiguration Complete message are the same (the first base station eNB), while the source base station is different from the target base station.

After establishment of the radio bearer RB to the third base station PhNB-T is completed (S264), the first base station eNB transmits, to the switching center MME, a Path Switch Request message requesting that the U-plane path established between the user device UE and the gateway device GW through the second base station PhNB-S be changed so that the U-plane path passes through the third base station PhNB-T (S284). The Path Switch Request message includes identification information of the third base station PhNB-T, which is a new point through which the U-plane path passes. After receiving the Path Switch Request message from the first base station eNB, the switching center MME transmits the Path Switch Request message to the gateway device GW (S304).

Based on the received Path Switch Request message, the gateway device GW reconfigures settings of its own device using the identification information of the third base station PhNB-T so that the U-plane path established with the gateway device GW as one endpoint passes through the third base station PhNB-T. Then, the gateway device GW transmits a Path Switch Request Ack message to the switching center MME (S324). After receiving the Path Switch Request Ack message from the gateway device GW, the switching center MME transmits the Path Switch Request Ack message to the first base station eNB (S344).

After receiving the Path Switch Request Ack message, the first base station eNB transmits a Context Release message to the second base station PhNB-S (S364). After receiving the Context Release message, the second base station PhNB-S deletes context information related to the U-plane path that had been established through the second base station PhNB-S (S384).

In the handover operation described above, unlike in the conventional handover operation, the first base station eNB, which is neither the source base station nor the target base station, transmits the Handover Request message to the third base station PhNB-T, which is the target base station. Moreover, the first base station eNB, such as described above, transmits the RRC Connection Reconfiguration message and also receives the RRC Connection Reconfiguration Complete message. Furthermore, the first base station eNB, such as described above, transmits the Path Switch Request message to the switching center MME.

3-3. First Modification of Handover of Present Embodiment

In the above configuration in which the user device UE is handed over from the second base station PhNB-S to the third base station PhNB-T, the first base station eNB may transmit a Handover Request message to each of the second base station PhNB-S and the third base station PhNB-T.

Figure 14:
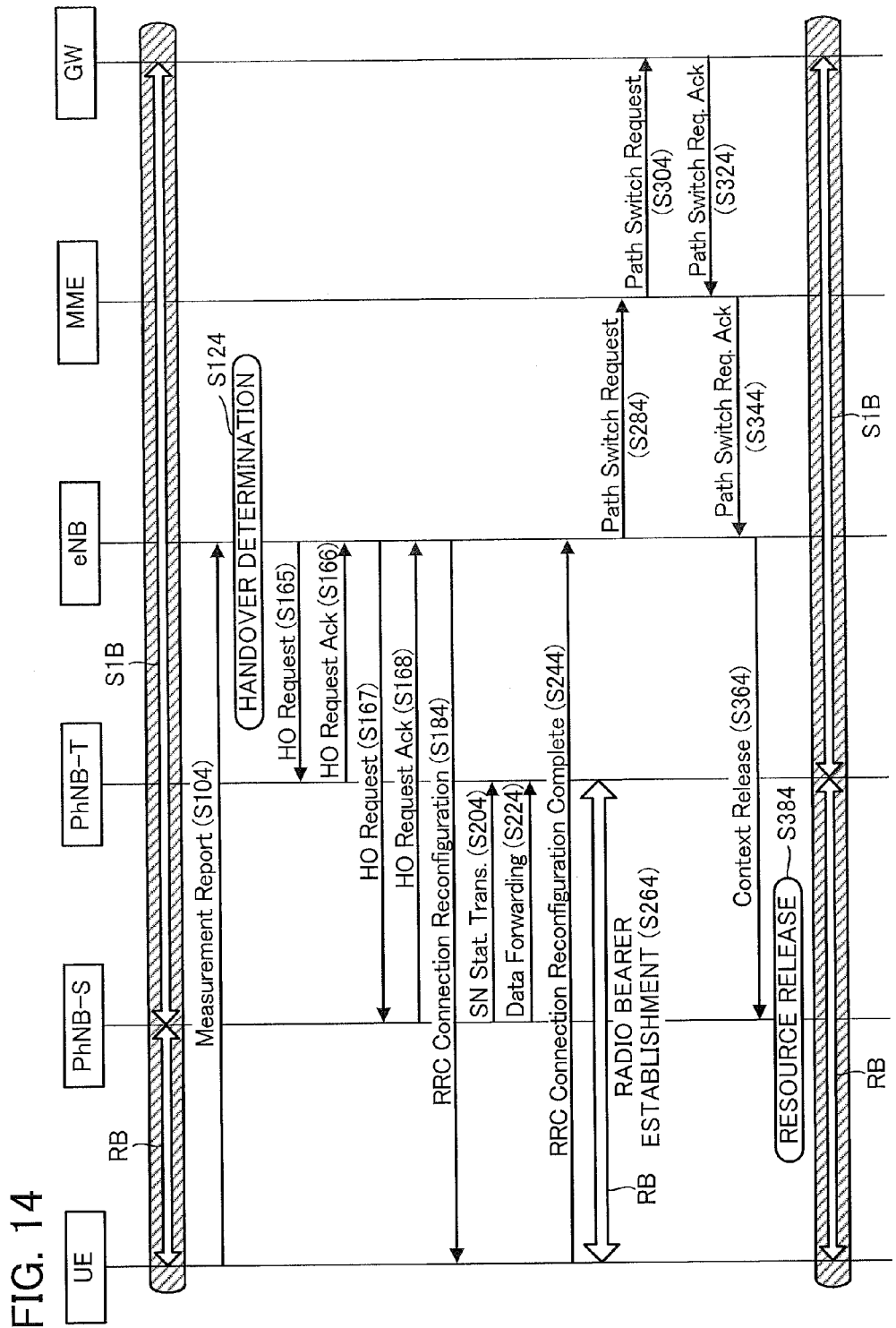
FIG. 14 is an operation flow illustrating a first modification of the handover operation according to the third embodiment.

More specifically, as shown in FIG. 14, after making the determination at step S124, the first base station eNB transmits a Handover Request message to the third base station PhNB-T through the X3 interface (S165). The Handover Request message includes identification information of the second base station PhNB-S, which is the source base station, and identification information of the gateway device GW, and requests that the user device UE be handed over from the second base station PhNB-S to the third base station PhNB-T. After receiving the Handover Request message, if the third base station PhNB-T can accommodate the user device UE, the third base station PhNB-T transmits a Handover Request Ack message to the first base station eNB through the X3 interface (S166). After receiving the Handover Request Ack message from the third base station PhNB-T, the first base station eNB transmits a Handover Request message to the second base station PhNB-S through the X3 interface (S167). The Handover Request message includes identification information of the third base station PhNB-T, which is the target base station, and requests that the user device UE be handed over from the second base station PhNB-S to the third base station PhNB-T. After receiving the Handover Request message, the second base station PhNB-S transmits a Handover Request Ack message to the first base station eNB through the X3 interface (S168). Operations other than the operations described above are similar to those in the third embodiment.

In the configuration according to the first modification, since the second base station PhNB-S and the third base station PhNB-T do not need to exchange control signals with each other, a connection (the X4 interface) between the second base station PhNB-S and the third base station PhNB-T may be omitted. In that case, transmitting of an SN Status Transfer message (S204) and performing of a data transfer (Data Forwarding) (S224) are omitted or are performed through the first base station eNB.

3-4. Second Modification of Handover of Present Embodiment

In the above configuration in which the user device UE is handed over from the second base station PhNB-S to the third base station PhNB-T, the first base station eNB may transmit a Handover Request message to the second base station PhNB-S.

Figure 15:
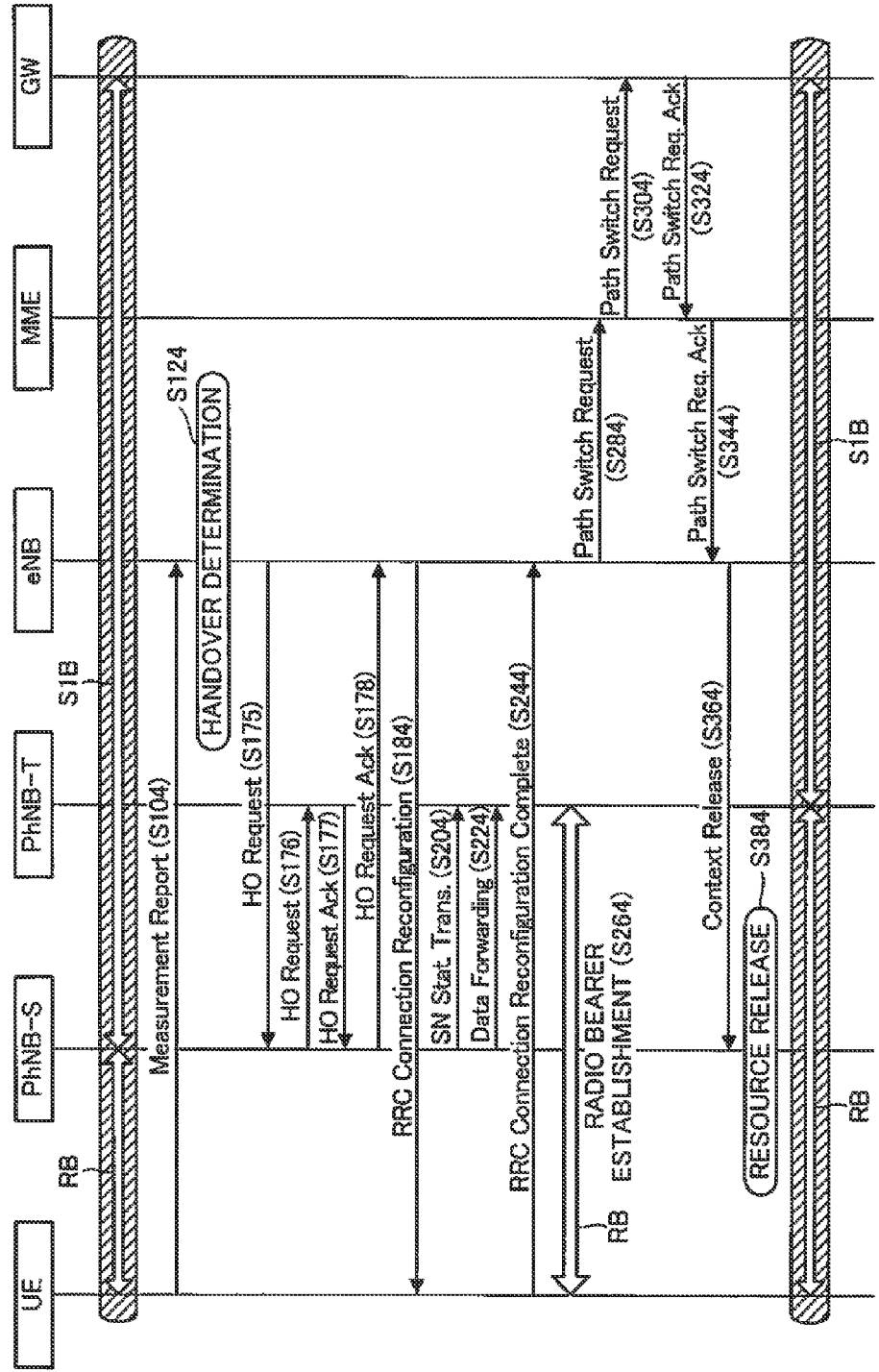
FIG. 15 is an operation flow illustrating a second modification of the handover operation according to the third embodiment.

More specifically, as shown in FIG. 15, after making the determination at step S124, the first base station eNB transmits a Handover Request message to the second base station PhNB-S through the X3 interface (S175). The Handover Request message includes identification information of the third base station PhNB-T, which is the target base station, and requests that the user device UE be handed over from the second base station PhNB-S to the third base station PhNB-T. After receiving the Handover Request message, the second base station PhNB-S transmits a Handover Request message that includes identification information of the gateway device GW to the third base station PhNB-T through the X4 interface (S176). After receiving the Handover Request message, if the third base station PhNB-T can accommodate the user device UE, the third base station PhNB-T transmits a Handover Request Ack message to the second base station PhNB-S through the X4 interface (S177). After receiving the Handover Request Ack message, the second base station PhNB-S transmits a Handover Request Ack message to the first base station eNB through the X3 interface (S178). Operations other than the operations described above are similar to those in the third embodiment.

At step S176 in the second modification, if the third base station PhNB-T determines, after receiving the Handover Request message, that it cannot accommodate the user device UE, a Handover Preparation Failure message indicating that the user device UE cannot be handed over to the third base station PhNB-T is transmitted from the third base station PhNB-T to the first base station eNB through the second base station PhNB-S. Then, the handover procedure is repeated from step S104 at which a Measurement Report is received. As a result, according to the configuration of the second modification, overhead accompanying the handover operation may be excessive. In light of the situation above, at the handover determination (S124) of the second modification, based on received power that are from multiple base stations PhNB and are included in the Measurement Report message, multiple target base station candidates are preferably determined and identification information of the target base station candidates are preferably included in the Handover Request message to be transmitted to the second base station PhNB-S. If the second base station PhNB-S received the Handover Preparation Failure message from the third base station PhNB-T, the second base station PhNB-S preferably transmits another Handover Request message that indicates another base station that is included in the target base station candidates as a new third base station PhNB-T.

3-5. Advantages of Present Embodiment

According to the third embodiment described above, the first base station eNB transmits an RRC Connection Reconfiguration message to the user device UE and receives an RRC Connection Reconfiguration Complete message from the user device UE. Therefore, even if both the source base station and the target base station are base stations (the second base station PhNB-S, the third base station PhNB-T) that do not perform radio resource control of the user device UE (have limited control functions), the user device UE can be handed over.

According to the configuration of the present embodiment, after the first base station eNB transmits a Handover Request message to the third base station PhNB-T, the handover procedure is performed by the third base station PhNB-T and the second base station PhNB-S transmitting control messages. Therefore, compared with a configuration in which the first base station eNB controls each base station individually, a control load on the first base station eNB is reduced. Moreover, since a Handover Request message is transmitted to the third base station PhNB-T, which is the target base station, compared with a configuration in which a Handover Request message is transmitted through another base station (the second base station PhNB-S, etc.), a control load on the first base station eNB is suppressed even when the third base station PhNB-T cannot accommodate the user device UE.

According to the configuration of the first modification, the first base station eNB transmits a Handover Request message to each of the second base station PhNB-S and the third base station PhNB-T. Therefore, compared with a configuration in which the first base station eNB transmits a Handover Request message to any one of the base stations and the base stations other than the first base station eNB (i.e., the second base station PhNB-S and the third base station PhNB-T) perform the handover procedure between them, overhead at the second base station PhNB-S and at the third base station PhNB-T is reduced.

According to the configuration of the second modification, after the first base station eNB transmits a Handover Request message to the second base station PhNB-S, the handover procedure is performed by the second base station PhNB-S and the third base station PhNB-T transmitting control messages. Therefore, advantages similar to those of the present embodiment are obtained.

Fourth Embodiment

In the first embodiment through the third embodiment, when the user device UE is handed over, a U-plane path that passes through a base station (the second base station PhNB, the third base station PhNB-T, etc.) with limited control functions is controlled. In a fourth embodiment through a sixth embodiment, a U-plane path that passes through a base station (the second base station PhNB) with limited control functions is established. A configuration of each element in a radio communication system CS is similar to that in the above embodiments (in particular, the first embodiment).

4-1. U-Plane Establishment of Present Embodiment

Figure 16:
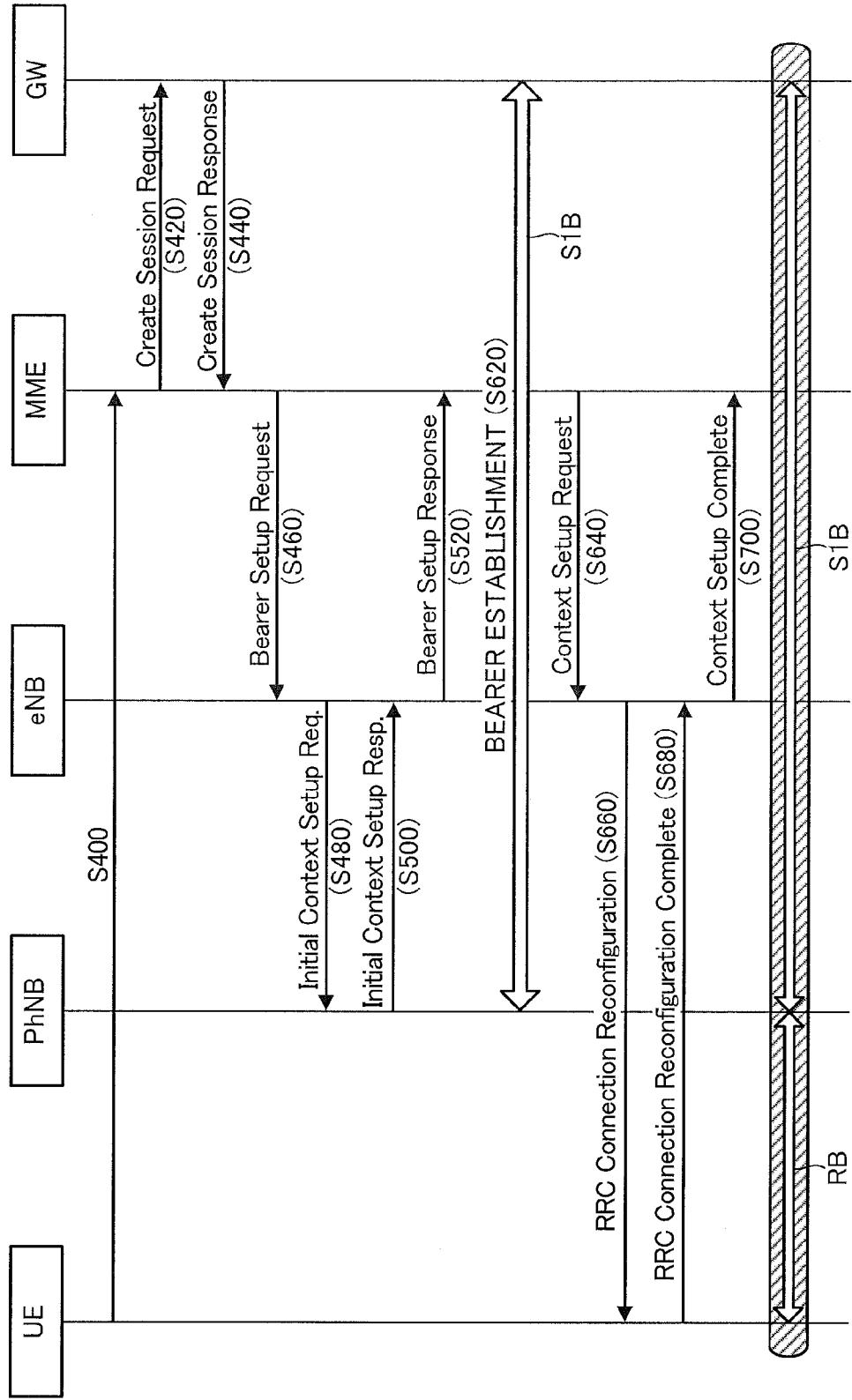
FIG. 16 is an operation flow illustrating an example of a user-plane establishment operation according to a fourth embodiment.

With reference to FIG. 16, a U-plane establishment operation according to the fourth embodiment is described. In FIG. 16, it is assumed that while a C-plane path has been established between the user device UE and the first base station eNB and between the first base station eNB and the switching center MME, a U-plane path has not been established.

The user device UE transmits a message (a NAS Service Request message, a PDN Connectivity Request message, etc.) requesting establishment of a U-plane path to the switching center MME through the first base station eNB, to which the user device UE is currently connected in terms of the C-plane (S400).

The switching center MME, in accordance with the message requesting establishment of a U-plane path, transmits a Create Session Request message (a session establishment request message) to the gateway device GW (S420). The Create Session Request message is a message that requests establishment of a U-plane logical path (an S1 bearer S1B) between the gateway device GW and the second base station PhNB. After receiving the Create Session Request message, the gateway device GW transmits a Create Session Response message (a session establishment response message) that includes identification information (an IP address and a TEID) of the gateway device GW to the switching center MME (S440).

After receiving the Create Session Response message, the switching center MME transmits a Bearer Setup Request message (a bearer establishment request message) that includes the identification information of the gateway device GW to the first base station eNB (S460). After receiving the Bearer Setup Request message, the first base station eNB transmits an Initial Context Setup Request message (an initial context setup request message) that includes the identification information of the gateway device GW to the second base station PhNB through the X3 interface (S480). After receiving the Initial Context Setup Request message, the second base station PhNB stores the identification information of the gateway device GW as one endpoint of the U-plane path to be established. Then, the second base station PhNB transmits an Initial Context Setup Response message (an initial context setup response message) that includes identification information of the second base station PhNB to the first base station eNB through the X3 interface (S500). The first base station eNB transmits a Bearer Setup Response message (a bearer establishment response message) that includes the identification information of the second base station PhNB to the switching center MME (S520). By the above operation, a U-plane path (an S1 bearer S1B) is established between the gateway device GW and the second base station PhNB (S620).

Subsequently, the switching center MME transmits a Context Setup Request message (a context setup request message) to the first base station eNB (S640). After receiving the Context Setup Request message, the first base station eNB transmits an RRC Connection Reconfiguration message (a radio connection reconfiguration message) commanding that a radio bearer RB be established between the second base station PhNB and the user device UE to the user device UE (S660). The RRC Connection Reconfiguration message includes a parameter (e.g., identification information of the second base station PhNB) necessary for the user device UE to wirelessly connect to the second base station PhNB.

The user device UE, in accordance with the received RRC Connection Reconfiguration message, reconfigures settings of its own device so as to establish a radio bearer RB to the second base station PhNB. After confirming a successful access to the second base station PhNB, the user device UE transmits an RRC Connection Reconfiguration Complete message (a radio connection reconfiguration complete message) to the first base station eNB (S680). It should be noted that the first base station eNB, which is not in the path of the U-plane path to be established, transmits the RRC Connection Reconfiguration message and receives the RRC Connection Reconfiguration Complete message. After receiving the RRC Connection Reconfiguration Complete message, the first base station eNB transmits a Context Setup Complete message (a context setup complete message) to the switching center MME (S700).

4-2. Advantages of Present Embodiment

According to the fourth embodiment described above, in a U-plane path establishment operation, after receiving a Bearer Setup Request message from the switching center MME, the first base station eNB controls the second base station PhNB and the user device UE so that a U-plane path is established through the second base station PhNB. Thus, a U-plane path can be established through the second base station PhNB, which does not perform radio resource control of the user device UE.

Fifth Embodiment 5-1. U-Plane Establishment of Present Embodiment

Figure 17:
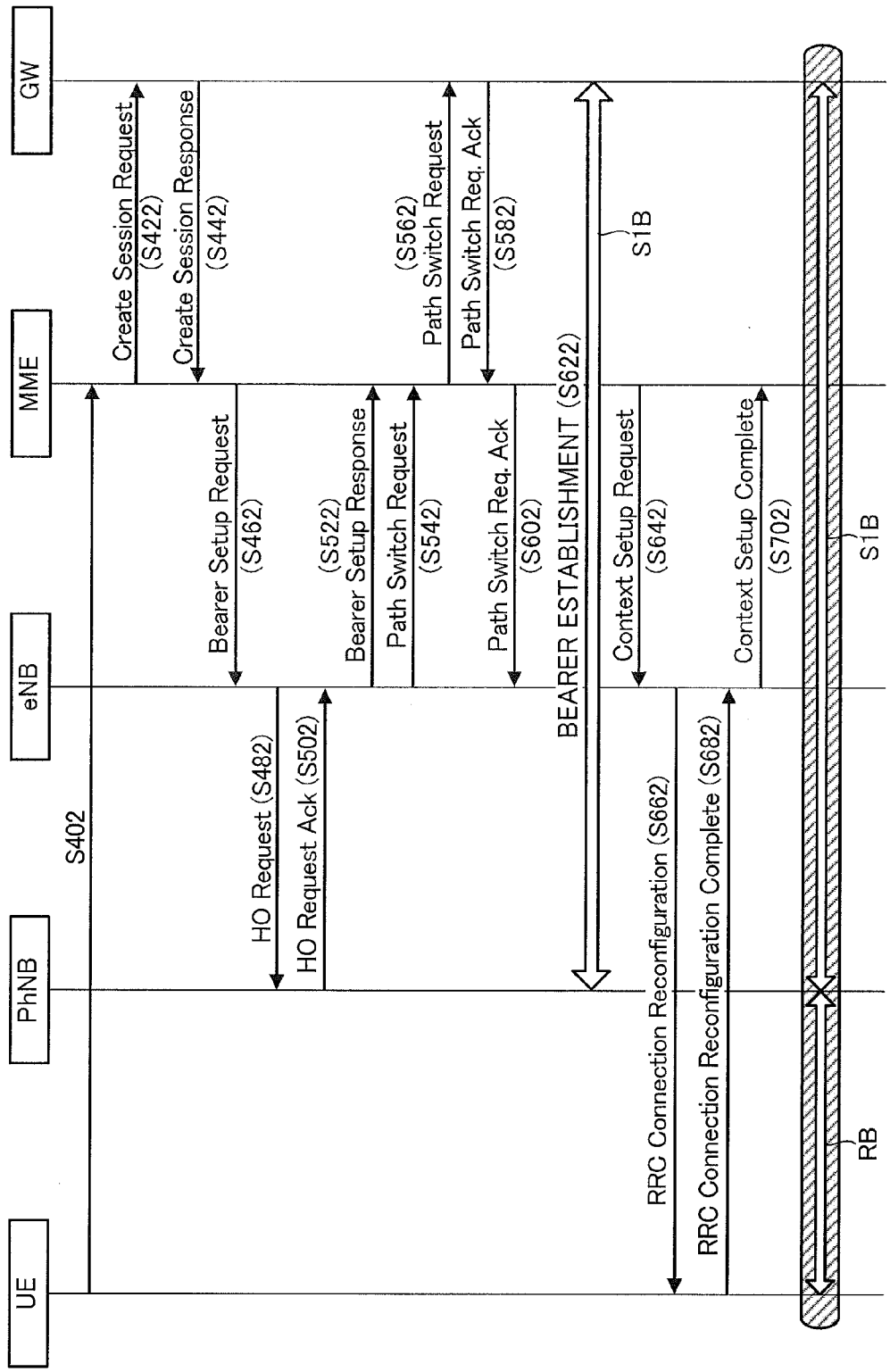
FIG. 17 is an operation flow illustrating an example of a user-plane establishment operation according to a fifth embodiment.

With reference to FIG. 17, a U-plane establishment operation according to the fifth embodiment is described. In FIG. 17, as in FIG. 16, it is assumed that while a C-plane path has been established between the user device UE and the first base station eNB and between the first base station eNB and the switching center MME, a U-plane path has not been established. Steps S402 through S442 in FIG. 17 are similar to steps S400 through S440 in FIG. 16.

After receiving a Create Session Response message from the gateway device GW, the switching center MME transmits a Bearer Setup Request message that includes identification information of the gateway device GW to the first base station eNB (S462). After receiving the Bearer Setup Request message, the first base station eNB transmits a Handover Request message that includes the identification information of the gateway device GW to the second base station PhNB through the X3 interface (S482). After receiving the Handover Request message, the second base station PhNB transmits a Handover Request Ack message (a handover request acknowledgement message) to the first base station eNB through the X3 interface (S502). After receiving the Handover Request Ack message, the first base station eNB transmits a Bearer Setup Response message (a bearer establishment response message) that includes identification information of the first base station eNB to the switching center MME (S522) and transmits a Path Switch Request message (a path switching request message) to the switching center MME (S542). The Path Switch Request message is a message that requests establishment of a U-plane path between the user device UE and the gateway device GW through the second base station PhNB.

After receiving the Path Switch Request message, the switching center MME transmits the Path Switch Request message to the gateway device GW (S562). After configuring the gateway device GW based on the Path Switch Request message received from the switching center MME so that the U-plane path to be established passes through the second base station PhNB, the gateway device GW transmits a Path Switch Request Ack message (a path switching request acknowledgement message) to the switching center MME (S582). After receiving the Path Switch Request Ack message, the switching center MME transmits the Path Switch Request Ack message to the first base station eNB.

By the above operation, a U-plane path (an S1 bearer S1B) is established between the gateway device GW and the second base station PhNB (S622). Steps S642 through S702 are similar to steps S640 through S700 in FIG. 16.

The Handover Request message transmitted at step S482 above may instead be an Initial Context Setup Request message. The Handover Request Ack message transmitted at step S502 above may instead be an Initial Context Setup Response message.

5-2. Modification of U-Plane Establishment of Present Embodiment

Figure 18:
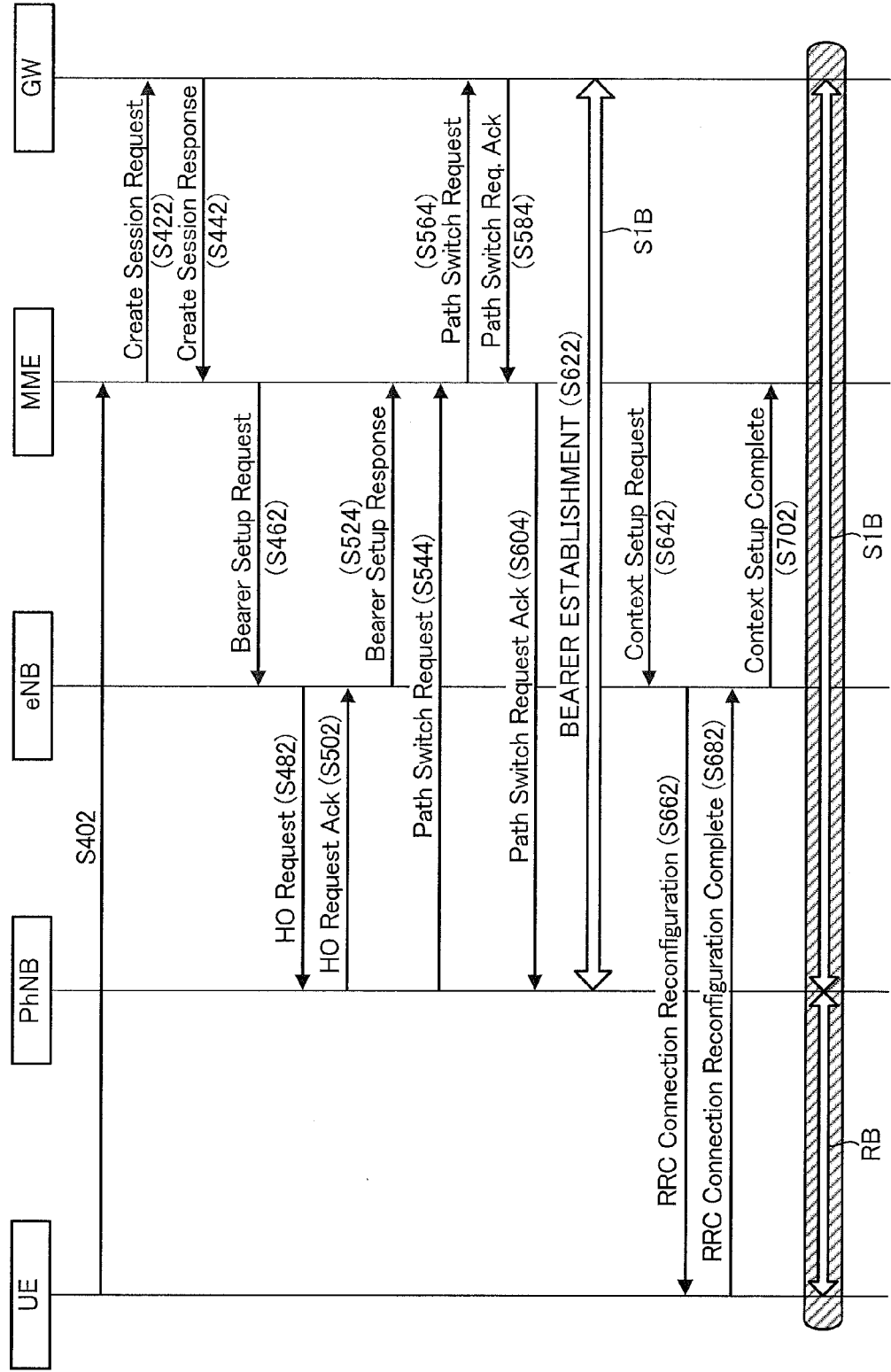
FIG. 18 is an operation flow illustrating a modification of the user-plane establishment operation according to the fifth embodiment.

In the above embodiment (FIG. 17), the first base station eNB transmits a Path Switch Request message. As shown in FIG. 18, a configuration may be adopted in which the second base station PhNB transmits a Path Switch Request message. In the present modification (FIG. 18), steps S402 through S502 and steps S622 through S702 are similar to steps S402 through S502 and steps S642 through S702 in the embodiment shown in FIG. 17. In the present modification, the configuration of the radio communication system CS as shown in FIG. 2 is adopted in which there is a C-plane interface (an S1-MME interface) between the switching center MME and the second base station PhNB.

After transmitting a Handover Request Ack message to the first base station eNB at step S502, the second base station PhNB transmits a Path Switch Request message that includes identification information of the first base station eNB to the switching center MME through the S1-MME interface (S544). The Path Switch Request message is a message that requests establishment of a U-plane path between the user device UE and the gateway device GW through the second base station PhNB. After receiving the Path Switch Request message, the switching center MME transmits the Path Switch Request message to the gateway device GW (S564). After configuring the gateway device GW based on the Path Switch Request message received from the switching center MME so that the U-plane path to be established passes through the second base station PhNB, the gateway device GW transmits a Path Switch Request Ack message to the switching center MME (S584). After receiving the Path Switch Request Ack message, the switching center MME transmits the Path Switch Request Ack message to the second base station PhNB. By the above operation, a U-plane path (an S1 bearer S1B) is established between the gateway device GW and the second base station PhNB (S624).

5-3. Advantages of Present Embodiment

According to the fifth embodiment described above, in a U-plane path establishment operation, after receiving a Bearer Setup Request message from the switching center MME, the first base station eNB controls the second base station PhNB and the user device UE so that a U-plane path is established through the second base station PhNB. The first base station eNB or the second base station PhNB requests the gateway device GW to perform path switching. Thus, a U-plane path can be established through the second base station PhNB, which does not perform radio resource control of the user device UE.

Sixth Embodiment

6-1. U-Plane Establishment of Present Embodiment

Figure 19:
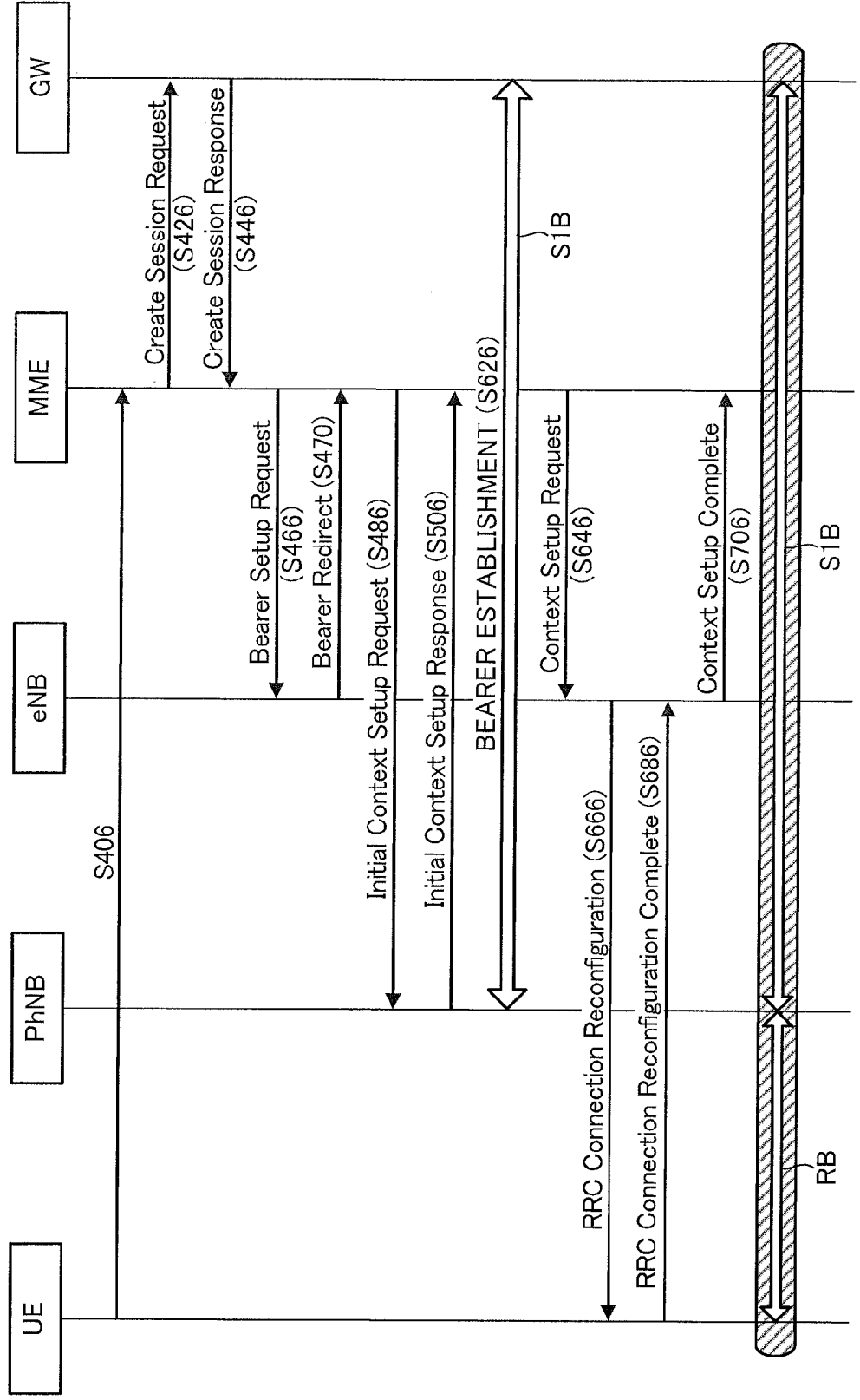
FIG. 19 is an operation flow illustrating an example of a user-plane establishment operation according to a sixth embodiment.

With reference to FIG. 19, a U-plane establishment operation according to the sixth embodiment is described. In FIG. 19, as in FIG. 16, etc., it is assumed that while a C-plane path has been established between the user device UE and the first base station eNB and between the first base station eNB and the switching center MME, a U-plane path has not been established. In the sixth embodiment, the configuration of the radio communication system CS as shown in FIG. 2 is adopted in which there is a C-plane interface (an S1-MME interface) between the switching center MME and the second base station PhNB. Steps S406 through S446 in FIG. 19 are similar to steps S400 through S440 in FIG. 16.

After receiving a Create Session Response message from the gateway device GW, the switching center MME transmits a Bearer Setup Request message that includes identification information of the gateway device GW to the first base station eNB (S466). After receiving the Bearer Setup Request message, the first base station eNB transmits a Bearer Redirect message (a bearer redirect message) that includes identification information of the second base station PhNB to the switching center MME (S470). The Bearer Redirect message is a message commanding that a U-plane path be established between the user device UE and the gateway device GW through the second base station PhNB.

After receiving the Bearer Redirect message, the switching center MME transmits an Initial Context Setup Request message that includes the identification information of the gateway device GW to the second base station PhNB (S486). After receiving the Initial Context Setup Request message, the second base station PhNB stores the identification information of the gateway device GW as one endpoint of the U-plane path to be established. Then, the second base station PhNB transmits an Initial Context Setup Response message that includes identification information of the second base station PhNB to the switching center MME (S506). By the above operation, a U-plane path (an S1 bearer S1B) is established between the gateway device GW and the second base station PhNB (S626). Steps S646 through S706 are similar to steps S640 through S700 in FIG. 16.

6-2. Advantages of Present Embodiment

According to the sixth embodiment described above, in a U-plane path establishment operation, after receiving a Bearer Setup Request message from the switching center MME, the first base station eNB controls the switching center MME so that a U-plane path is established through the second base station PhNB, and the switching center MME controls the second base station PhNB and the user device UE so as to establish the U-plane path. Thus, a U-plane path can be established through the second base station PhNB, which does not perform radio resource control of the user device UE.

Modifications

Various modifications may be applied to the above-described embodiments. Specific modifications are exemplified below. Two or more modes selected from among the above embodiments and the following examples may be combined as appropriate, provided that the combined modes do not conflict with each other.

7-1. Modification 1

In the above embodiments, path switching of a single U-plane path (an EPS bearer) is performed. The above path switching may be adopted when there are two or more established U-plane paths and the path of one of them is to be switched. For example, in a situation in which two U-plane paths have been established through the first base station eNB, when one of the U-plane paths is to have its path switched so that it passes through the second base station PhNB, the path switching in the above embodiments may be adopted. Moreover, in a situation in which one U-plane path has been established through the first base station eNB and another U-plane path has been established through the second base station PhNB, when the U-plane path passing through the second base station PhNB is to have its path switched so that it passes through the first base station eNB, the path switching in the above embodiments may be adopted.

In the above embodiments, establishment of a single U-plane path (an EPS bearer) is performed. The above U-plane path establishment may be adopted when there are one or more established U-plane paths and another U-plane path is to be established newly. For example, in a situation in which a U-plane path has been established through the first base station eNB, when another U-plane path is to be established through the second base station PhNB, the above U-plane path establishment may be adopted.

7-2. Modification 2

In the first embodiment through the third embodiment, path switching of a U-plane path is triggered by handover determination based on a Measurement Report message (received power (received quality) from a base station). However, path switching of a U-plane path may be triggered by any other appropriate event. For example, with congestion at a node in the network NW through which a U-plane path passes as a trigger, path switching of the U-plane path may be performed so as to avoid the congested node.

7-3. Modification 3

In the above embodiments, a logical path controlled by the communication control units (122, 232, 420, and 532) and by the communication processing unit 332 is a bearer. However, the communication control units (122, 232, 420, and 532) and the communication processing unit 332 may control other logical paths such as a session at the IP (Internet Protocol) level.

7-4. Modification 4

Figure 20:
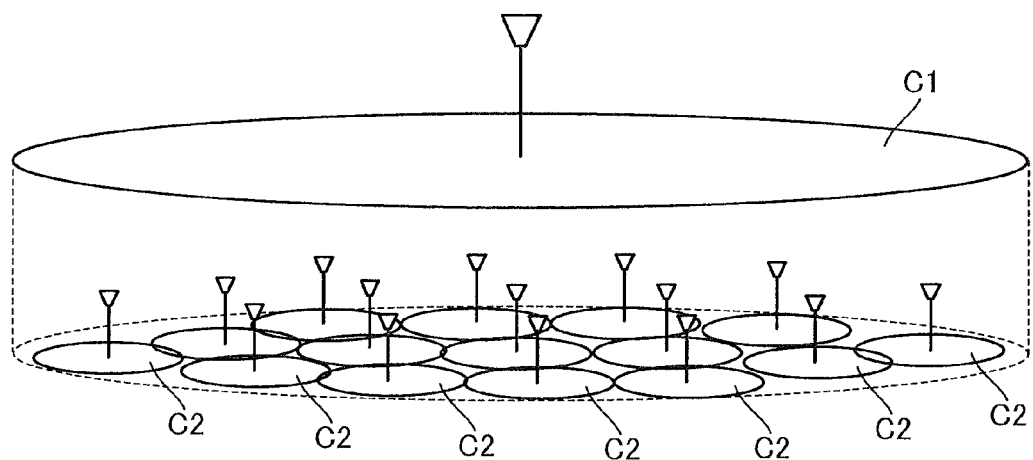
FIG. 20 is a drawing illustrating an example of a configuration of a cell formed by each base station.

In the above embodiments, the size of a cell C that each base station forms around it (the range within which radio waves of the base station reach a user device effectually) is freely chosen. For example, a configuration may be adopted in which radio transmitting capabilities (average transmitting power, maximum transmitting power, etc.) of the first base station eNB are greater than those of the second base station PhNB and the size of a cell (a macro cell C1) formed by the first base station eNB is larger than that of a cell (a small cell C2) formed by the second base station PhNB. In the above configuration, for example, as shown in FIG. 20, small cells C2 are preferably formed inside a macro cell C1 in a multi-layered manner (overlaid). (For descriptive purposes, a plane on which the macro cell C1 is shown differs from a plane on which the small cells C2 are shown. However, in reality, the macro cell C1 and the small cells C2 can be overlaid on the same plane (e.g., land surface).) Alternatively, a configuration may be adopted in which the first base station eNB and the second base station PhNB form cells C with similar sizes.

7-5. Modification 5

In the above embodiments, there is a U-plane path between base stations (the first base station eNB, the second base station PhNB (PhNB-S), the third base station PhNB-T). However, if a data transfer (Data Forwarding) between base stations is not to be performed at the time of a handover, there does not need to be a U-plane path between the base stations.

7-6. Modification 6

In the above embodiments, the second base station PhNB does not exchange control signals with the user device UE. However, a configuration may be adopted in which the second base station PhNB can exchange control signals of a lower layer (e.g., an L1 layer, an L2 layer). In the configuration above, the second base station PhNB still does not exchange signals related to radio resource control (control signals of an RRC layer). The description immediately above also applies to the third base station PhNB-T.

7-7. Modification 7

The user device UE is a freely chosen device that can perform radio communication with each base station (the first base station eNB, the second base station PhNB (PhNB-S), the third base station PhNB-T). The user device UE may be a mobile phone terminal such as a feature phone or a smartphone, a desktop personal computer, a laptop personal computer, a UMPC (Ultra-Mobile Personal Computer), a portable game machine, or any other type of radio terminal.

7-8. Modification 8

In each of the elements in the radio communication system CS (the user device UE, the first base station eNB, the second base station PhNB (PhNB-S), the third base station PhNB-T, the switching center MME, and the gateway device GW), functions executed by the CPU may be instead executed by hardware or by a programmable logic device, such as an FPGA (Field Programmable Gate Array) and a DSP (Digital Signal Processor).

7-9. Modification 9

A configuration may be adopted in which a frequency band of radio waves transmitted by the first base station eNB is different from that of radio waves transmitted by the second base station PhNB. For example, a configuration is assumed in which the first base station eNB performs radio communication using a first frequency band (e.g., 2 GHz band) and the second base station PhNB performs radio communication using a second frequency band (e.g., 3.5 GHz band) that is higher than the first frequency band. Because propagation loss becomes greater as the frequency becomes higher, radio communication using the first frequency band tends to be more stable than radio communication using the second frequency band. As described in the above embodiments, it is the first base station eNB that exchanges control signals (performs C-plane communication) with the user device UE. Therefore, if the configuration of the present modification is adopted, since control signals are exchanged (C-plane communication is performed) using the first frequency band, which is more stable, the user device UE can be controlled in a more secure manner. The description on the second base station PhNB in the present modification also applies to the third base station PhNB-T.

REFERENCE SYMBOLS

UE: User Device
110: Radio Communication Unit

120: Control Unit
122: Communication Control Unit
124: Data Transceiving Unit
130: Storage Unit
eNB: First Base Station
210: Radio Communication Unit
220: Network Communication Unit
230: Control Unit
232: Communication Control Unit
234: Data Transceiving Unit
240: Storage Unit
PhNB (PhNB-S): Second Base Station
PhNB-T: Third Base Station
310: Radio Communication Unit
320: Network Communication Unit
330: Control Unit
332: Communication Processing Unit
334: Data Transceiving Unit
340: Storage Unit
MME: Switching Center
410: Network Communication Unit
420: Control Unit
430: Storage Unit
500: Gateway Device
GW: Gateway Device
510: Network Communication Unit
520: External Network Communication Unit
530: Control Unit
532: Communication Control Unit
534: Data Transceiving Unit
540: Storage Unit
CS: Radio Communication System
eNB-S: Source Base Station
eNB-T: Target Base Station
IN: Internet
NW: Network
RB: Radio Bearer
S1B: S1 Bearer

The invention claimed is:

1. A radio communication system comprising:
a user device;
base stations that comprise:
 a first base station that performs radio resource control of the user device through a control-plane path, the control-plane path being a logical path established with the user device; and
 a second base station that does not perform radio resource control of the user device;
a gateway device; and
a switching center that controls at least one user-plane path, each user-plane path being a logical path established between the user device and the gateway device,
wherein when at least one user-plane path is established between the user device and the gateway device through the first base station,
the first base station determines, based on a measurement report message that is received from the user device and is related to radio waves that the second base station transmits, whether the first base station should cause the user device to be handed over to the second base station with respect to a user plane, and
wherein when the first base station determines that the first base station should cause the user device to be handed over with respect to the user plane,
the first base station transmits a handover request message to the second base station, the handover request message requesting that the user device be handed over to the second base station,
the second base station, after receiving the handover request message, transmits a handover request acknowledgement message to the first base station,
the first base station, after receiving the handover request acknowledgement message, transmits, to the user device, a radio connection reconfiguration message commanding that a radio bearer be established between the second base station and the user device,
the user device, after configuring the user device so as to establish the radio bearer to the second base station in accordance with the radio connection reconfiguration message, transmits a radio connection reconfiguration complete message to the first base station,
the first base station transmits a path switching request message to the switching center, the path switching request message comprising identification information of the second base station and requesting that a single user-plane path, which is established between the user device and the gateway device and passes through the first base station, be changed so that the single user-plane path passes through the second base station,
the switching center transmits the path switching request message received from the first base station to the gateway device,
the gateway device, after configuring the gateway device based on the path switching request message received from the switching center so that the single user-plane path passes through the second base station, transmits a path switching request acknowledgement message to the switching center, and
the switching center transmits the path switching request acknowledgement message received from the gateway device to the first base station.

2. A radio communication system comprising:
a user device;
base stations that comprise:
 a first base station that performs radio resource control of the user device through a control-plane path, the control-plane path being a logical path established with the user device; and
 a second base station and a third base station that do not perform radio resource control of the user device;
a gateway device; and
a switching center that controls at least one user-plane path, each user-plane path being a logical path established between the user device and the gateway device,
wherein when at least one user-plane path is established between the user device and the gateway device through the second base station,
the first base station determines, based on a measurement report message that is received from the user device and is related to radio waves that the third base station transmits, whether the first base station should cause the user device to be handed over to the third base station with respect to a user plane, and
wherein when the first base station determines that the first base station should cause the user device to be handed over with respect to the user plane,
the first base station transmits a handover request message directed at the third base station to the third base station, the handover request message comprising identification information of the second base station to which the user device is currently connected and identification information of the gateway device and requesting that the user device be handed over to the third base station, the third base station, after receiving the handover request message directed at the third base station, transmits a handover request acknowledgement message to the first base station, the first base station, after receiving the handover request acknowledgement message from the third base station, transmits a handover request message directed at the second base station to the second base station, the first base station transmits, to the user device, a radio connection reconfiguration message commanding that a radio bearer be established between the third base station and the user device, the user device, after configuring the user device so as to establish the radio bearer to the third base station in accordance with the radio connection reconfiguration message, transmits a radio connection reconfiguration complete message to the first base station, the first base station transmits a path switching request message to the switching center, the path switching request message comprising the identification information of the third base station and requesting that a single user-plane path, which is established between the user device and the gateway device and passes through the second base station, be changed so that the single user-plane path passes through the third base station, the switching center transmits the path switching request message received from the first base station to the gateway device, the gateway device, after configuring the gateway device based on the path switching request message received from the switching center so that the single user-plane path passes through the third base station, transmits a path switching request acknowledgement message to the switching center, the switching center transmits the path switching request acknowledgement message received from the gateway device to the first base station, the first base station transmits the path switching request acknowledgement message received from the switching center to the second base station, and the second base station deletes information related to the single user-plane path that had been established through the second base station.

* * * * *